(12) United States Patent
Uchida

(10) Patent No.: US 8,805,169 B2
(45) Date of Patent: Aug. 12, 2014

(54) INFORMATION PROCESSING APPARATUS AND METHOD THEREFOR

(75) Inventor: Hitoshi Uchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/302,456

(22) Filed: Nov. 22, 2011

(65) Prior Publication Data

US 2012/0155831 A1    Jun. 21, 2012

(30) Foreign Application Priority Data

Dec. 16, 2010 (JP) ................................. 2010-281012
Nov. 15, 2011 (JP) ................................. 2011-250057

(51) Int. Cl.
*H04N 5/92* (2006.01)
*H04N 5/84* (2006.01)
*H04N 5/89* (2006.01)
*G11B 27/034* (2006.01)
*G11B 27/32* (2006.01)
*H04N 5/76* (2006.01)

(52) U.S. Cl.
CPC ................ *G11B 27/034* (2013.01); *H04N 5/76* (2013.01); *G11B 27/329* (2013.01)
USPC .......................................... 386/326; 386/332

(58) Field of Classification Search
USPC ......................................... 386/326, 332–336
See application file for complete search history.

(56) References Cited

U.S. PATENT DOCUMENTS

| | | | |
|---|---|---|---|
| 7,461,168 B1 | 12/2008 | Wan | 709/245 |
| 2007/0086726 A1* | 4/2007 | Seo et al. | 386/95 |
| 2007/0261092 A1 | 11/2007 | Ozawa et al. | 725/115 |
| 2009/0252475 A1* | 10/2009 | Chiba et al. | 386/83 |
| 2010/0046923 A1* | 2/2010 | Ikeda et al. | 386/95 |

FOREIGN PATENT DOCUMENTS

| | | |
|---|---|---|
| JP | 2001-184243 A | 7/2001 |
| JP | 2007-295038 A | 11/2007 |

OTHER PUBLICATIONS

W3C Media Fragments URI 1.0, W3C Working Draft, Mar. 17, 2011, http://www.w3.org/TR/media-frags/.

* cited by examiner

*Primary Examiner* — Thai Tran
*Assistant Examiner* — Nigar Chowdhury
(74) *Attorney, Agent, or Firm* — Fitzpatrick, Cella, Harper & Scinto

(57) ABSTRACT

An apparatus inputs data described in a markup language, and analyzes a uniform resource identifier including a fragment description, which is contained in the data. As a result of the analysis, the apparatus determines whether there are connectable fragments which refer to the same resource. In a case where it is determined that there are connectable fragments which refer to the same resource, the apparatus generates a uniform resource identifier by integrating the connectable fragments.

13 Claims, 27 Drawing Sheets

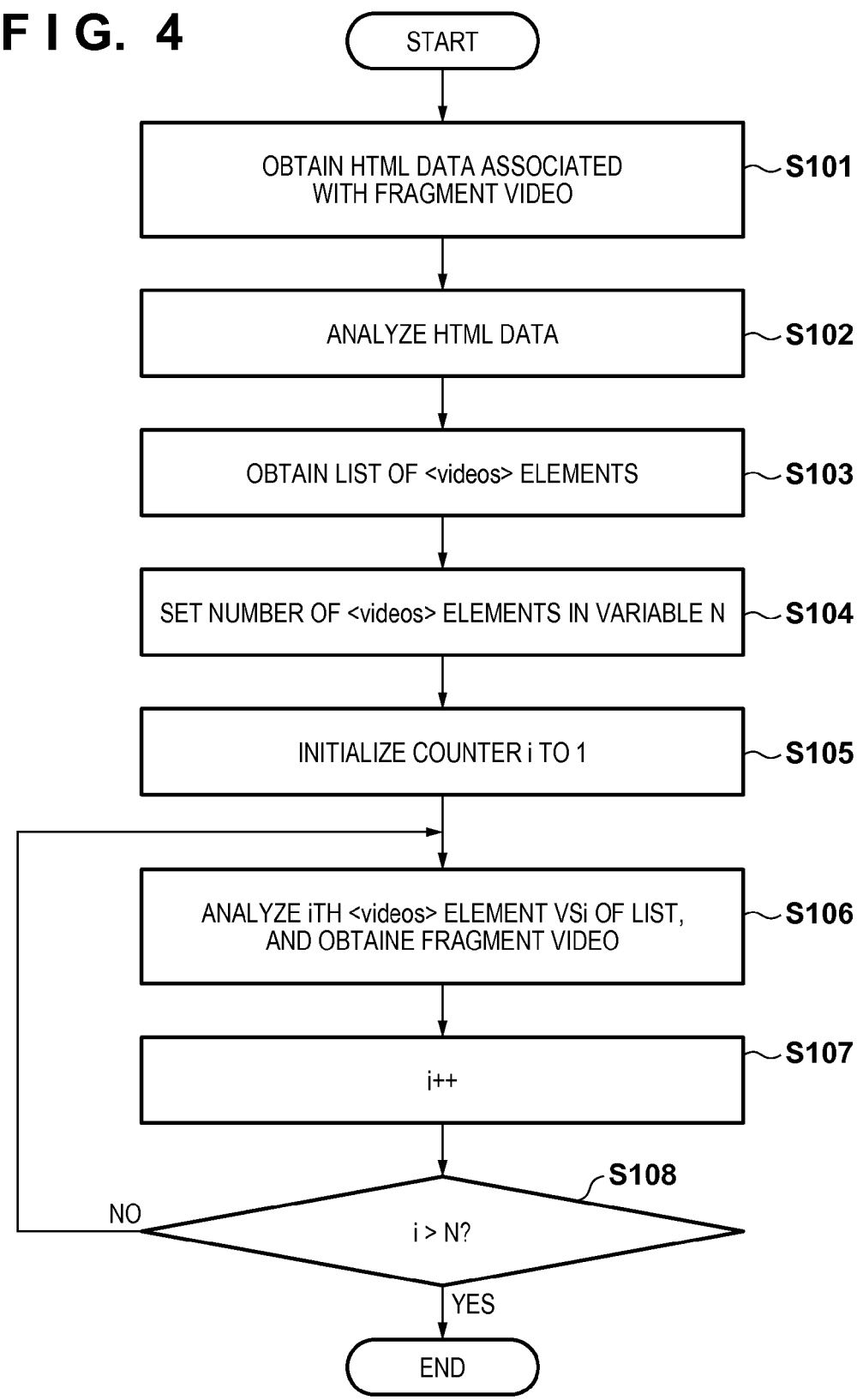

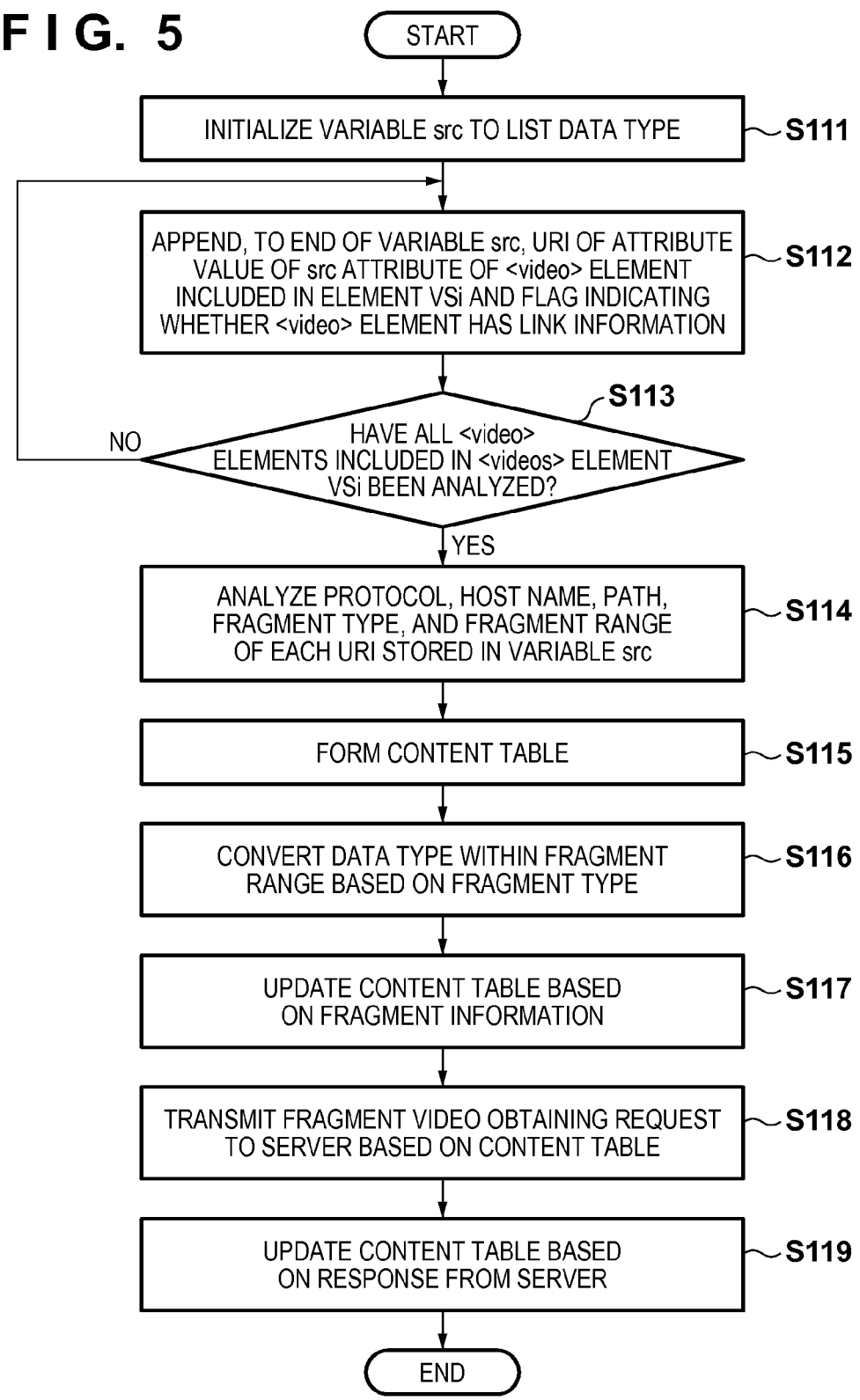

F I G. 6A

| PROTOCOL | HOST NAME | PATH | FRAGMENT TYPE | FRAGMENT RANGE | LINK FLAG |
|---|---|---|---|---|---|
| http | sample.org | /v1.ogv | t | [10, 20] | false |
| http | sample.org | /v2.ogv | t | [100, 200] | false |
| http | sample.org | /v1.ogv | t | [50, 60] | false |
| http | sample.org | /v1.ogv | t | [60, 70] | false |
| http | sample.org | /v1.ogv | t | [70, 80] | true |

F I G. 6B

| PROTOCOL | HOST NAME | PATH | FRAGMENT TYPE | FRAGMENT RANGE | LINK FLAG |
|---|---|---|---|---|---|
| http | sample.org | /v1.ogv | t | [10, 20] | false |
| http | sample.org | /v2.ogv | t | [100, 200] | false |
| http | sample.org | /v1.ogv | t | [50, 70] | false |
| http | sample.org | /v1.ogv | t | [70, 80] | true |

F I G. 6C

| PROTOCOL | HOST NAME | PATH | FRAGMENT TYPE | FRAGMENT RANGE | BYTE RANGE | STREAM INSTANCE |
|---|---|---|---|---|---|---|
| http | sample.org | /v1.ogv | t | [10, 20] | 1000-2000/10000 | stream1 |
| http | sample.org | /v2.ogv | t | [100, 200] | 10000-20000/100000 | stream2 |
| http | sample.org | /v1.ogv | t | [50, 70] | 5000-7000/10000 | stream1 |
| http | sample.org | /v1.ogv | t | [70, 80] | 7000-8000/10000 | stream1 |

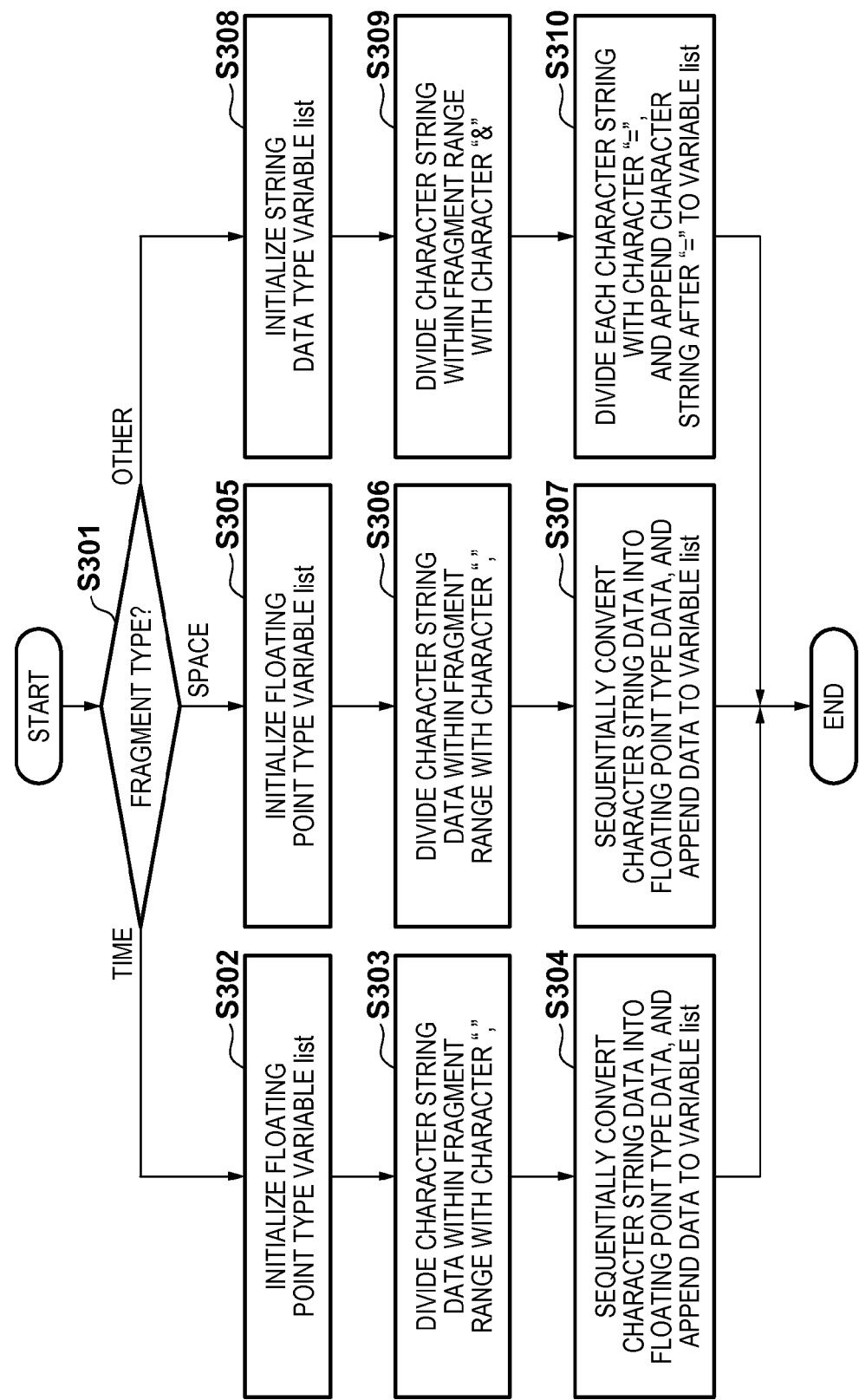

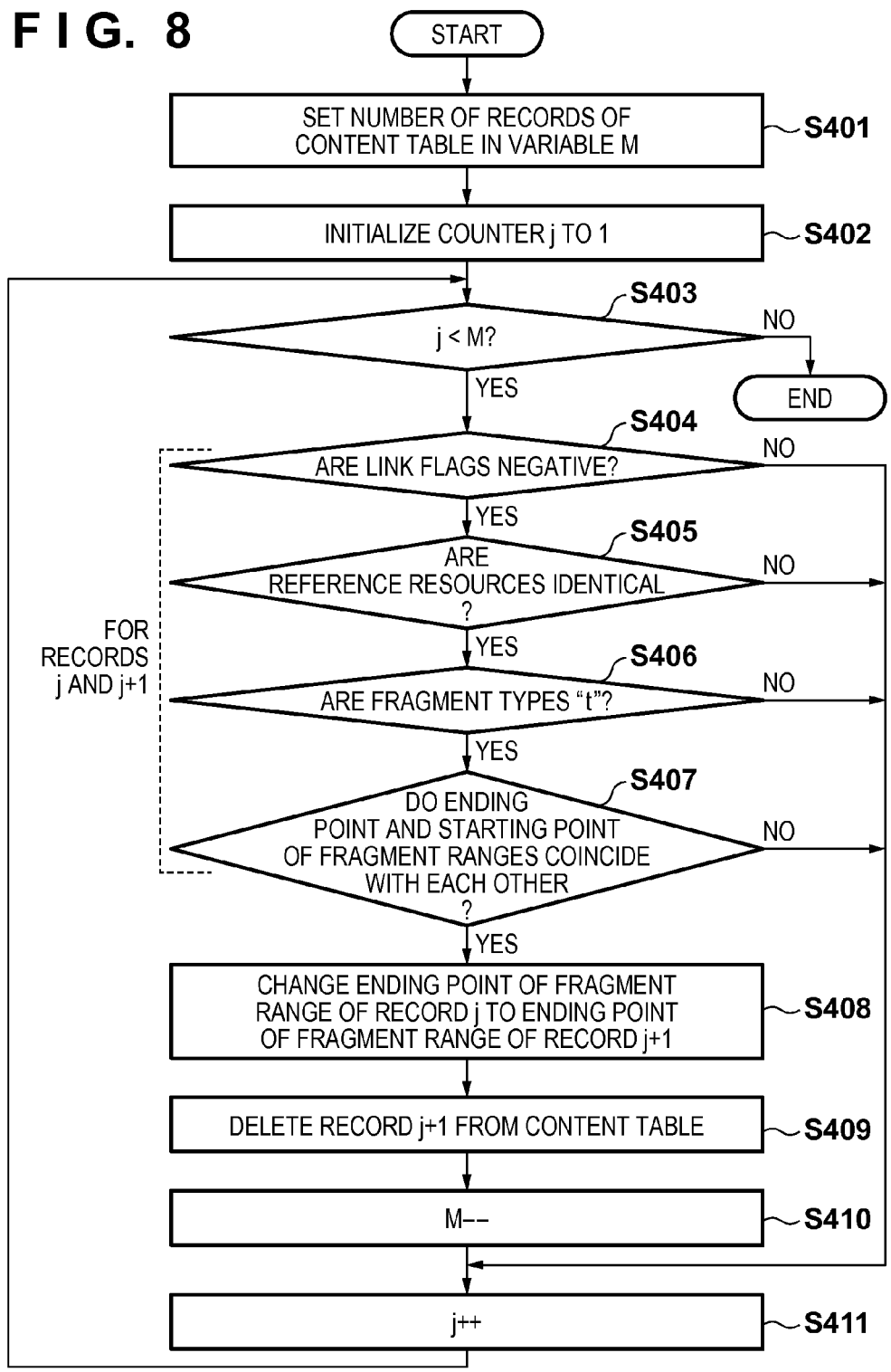

F I G. 11A
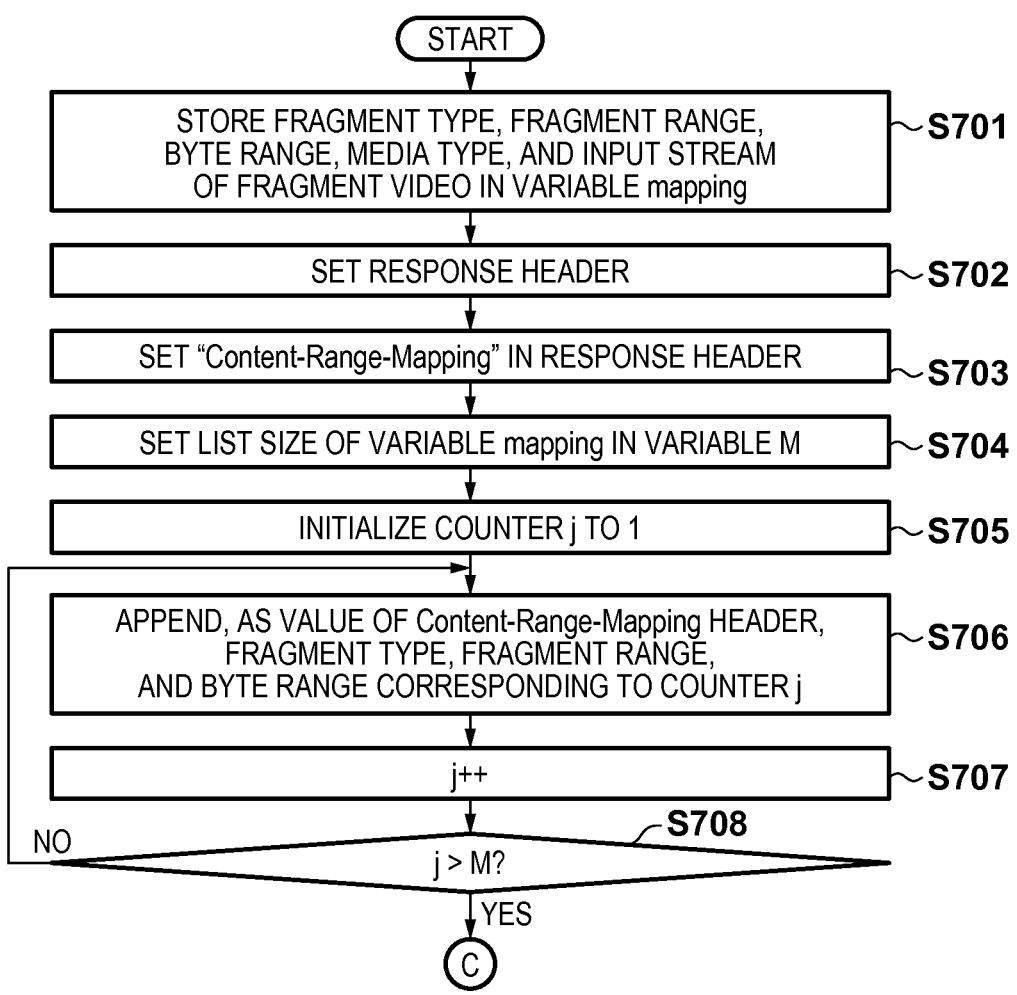

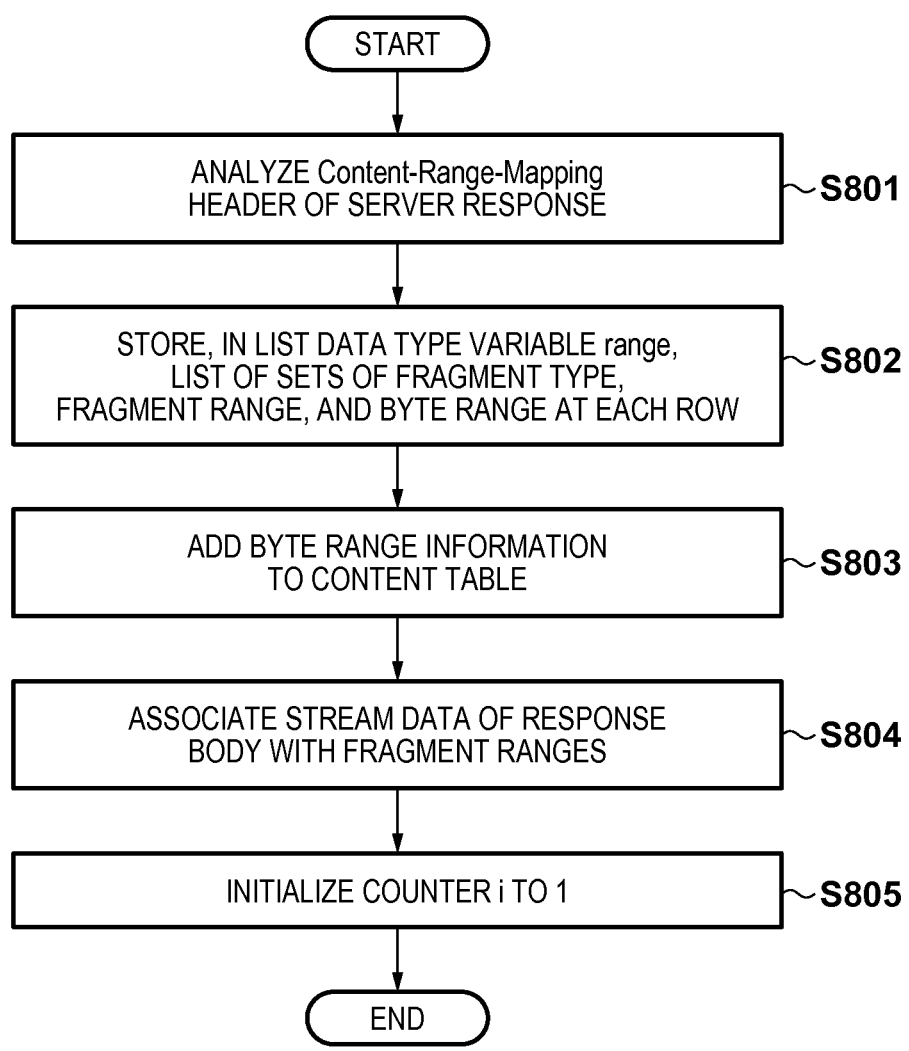
F I G. 12

FIG. 13

| PROTOCOL | HOST NAME | PATH | FRAGMENT TYPE | FRAGMENT RANGE |
|---|---|---|---|---|
| http | sample.org | /v1.ogv | t | [10, 20] |
| http | sample.org | /v2.ogv | t | [100, 200] |
| http | sample.org | /v1.ogv | t | [50, 60] |
| http | sample.org | /v1.ogv | t | [65, 70] |

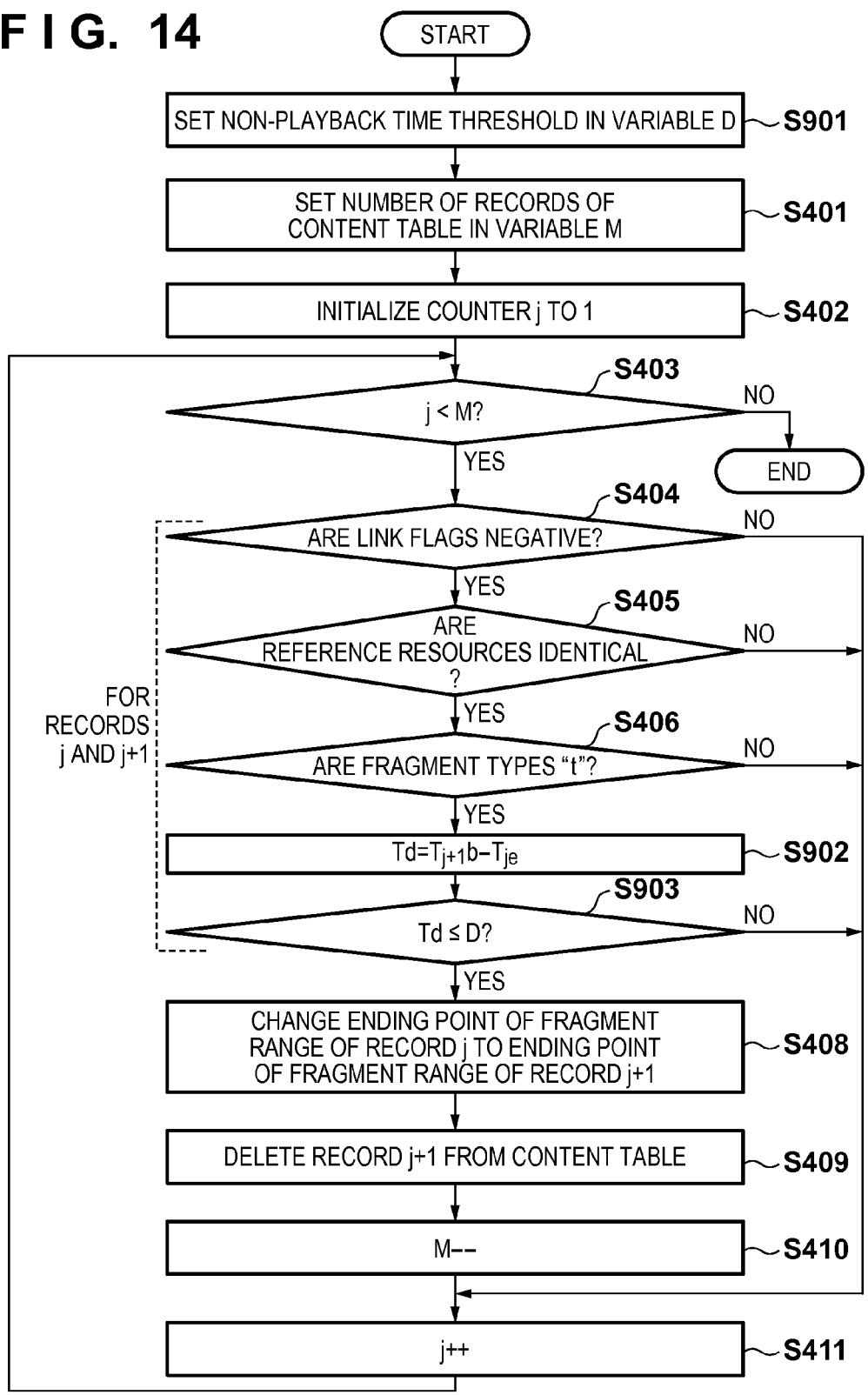

FIG. 16A

| PROTOCOL | HOST NAME | PATH | FRAGMENT TYPE | FRAGMENT RANGE |
|---|---|---|---|---|
| http | sample.org | /v1.ogv | xywh | [160, 120, 320, 240] |
| http | sample.org | /v1.ogv | xywh | [170, 360, 320, 240] |

FIG. 16B

| PROTOCOL | HOST NAME | PATH | FRAGMENT TYPE | FRAGMENT RANGE |
|---|---|---|---|---|
| http | sample.org | /v1.ogv | xywh | [160, 120, 330, 480] |

FIG. 16C

| PROTOCOL | HOST NAME | PATH | FRAGMENT TYPE | FRAGMENT RANGE | BYTE RANGE | STREAM INSTANCE |
|---|---|---|---|---|---|---|
| http | sample.org | /v1.ogv | xywh | [160, 120, 330, 480] | 1000-2000/10000 | stream1 |

F I G. 18
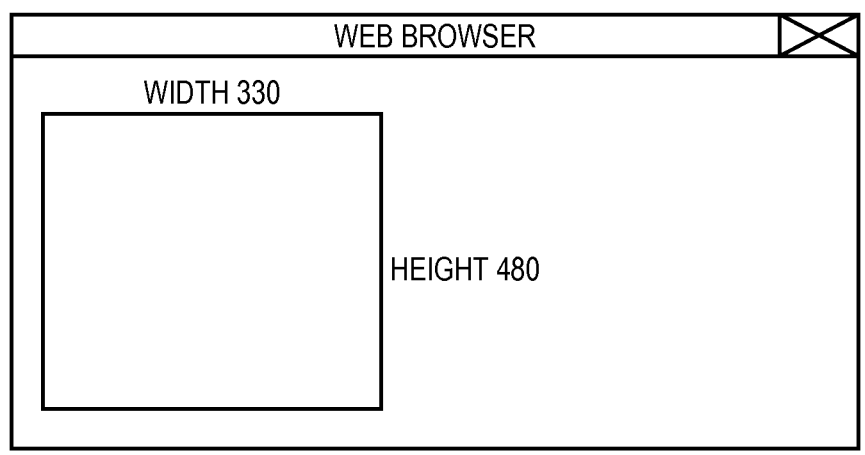

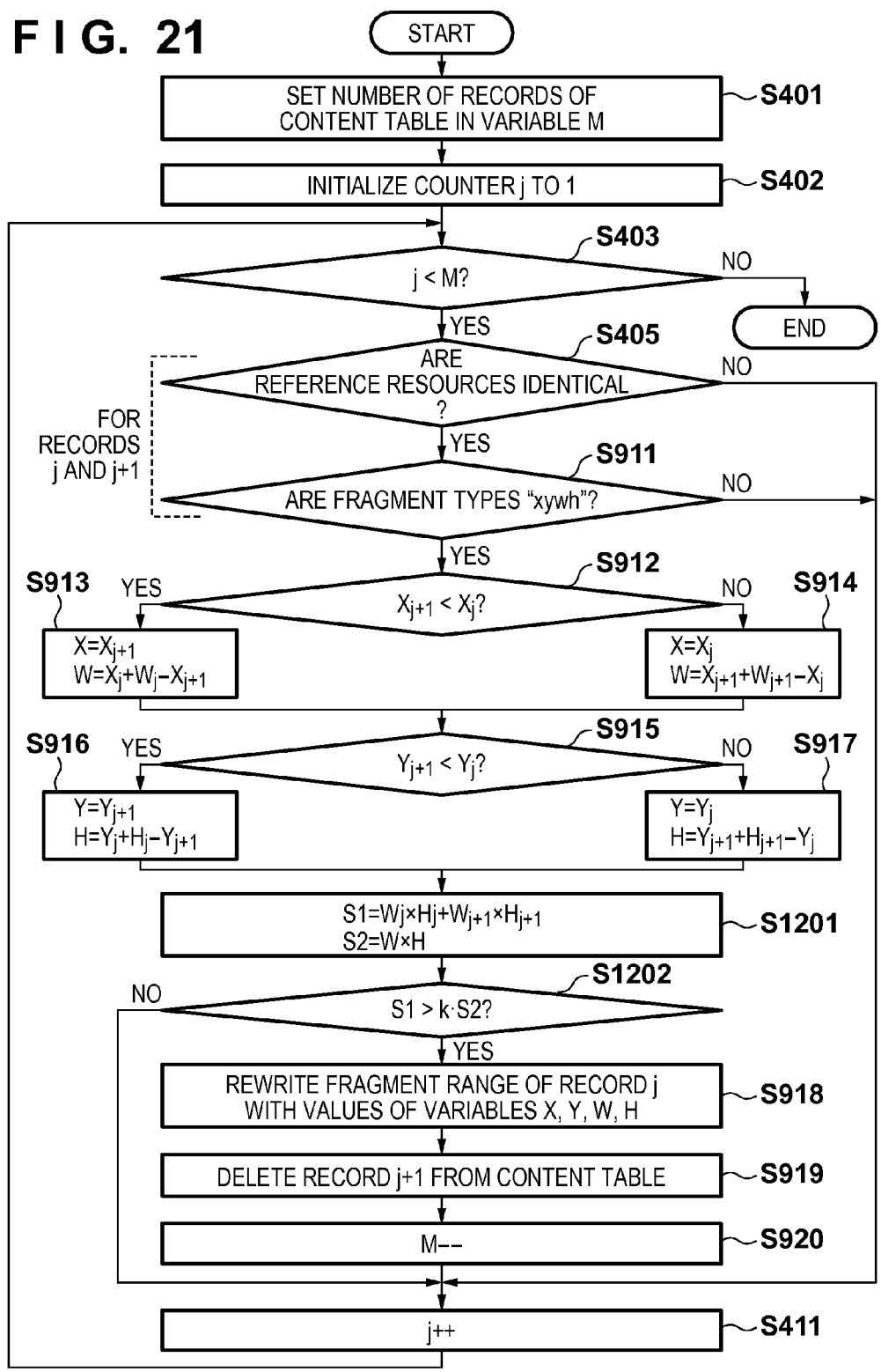

FIG. 22A

| PROTOCOL | HOST NAME | PATH | TIME FRAGMENT | SPACE FRAGMENT | LINK FLAG |
|---|---|---|---|---|---|
| http | sample.org | /v1.ogv | [10, 20] | [170, 360, 320, 240] | false |
| http | sample.org | /v2.ogv | [100, 200] | | false |
| http | sample.org | /v1.ogv | [50, 60] | [160, 120, 320, 240] | false |
| http | sample.org | /v1.ogv | [60, 70] | [170, 360, 320, 240] | false |
| http | sample.org | /v1.ogv | [70, 80] | | false |

FIG. 22B

| PROTOCOL | HOST NAME | PATH | TIME FRAGMENT | SPACE FRAGMENT | LINK FLAG |
|---|---|---|---|---|---|
| http | sample.org | /v1.ogv | [10, 20] | [170, 360, 320, 240] | false |
| http | sample.org | /v2.ogv | [100, 200] | | false |
| http | sample.org | /v1.ogv | [50, 70] | [160, 120, 330, 480] | false |
| http | sample.org | /v1.ogv | [70, 80] | | false |

FIG. 22C

| PROTOCOL | HOST NAME | PATH | TIME FRAGMENT | FRAGMENT RANGE | BYTE RANGE | STREAM INSTANCE |
|---|---|---|---|---|---|---|
| http | sample.org | /v1.ogv | [10, 20] | [170,360,320,240] | 1000-2000/10000 | stream1 |
| http | sample.org | /v2.ogv | [100, 200] | | 10000-20000/100000 | stream2 |
| http | sample.org | /v1.ogv | [50, 70] | [160,120,330,480] | 5000-7000/10000 | stream1 |
| http | sample.org | /v1.ogv | [70, 80] | | 7000-8000/10000 | stream1 |

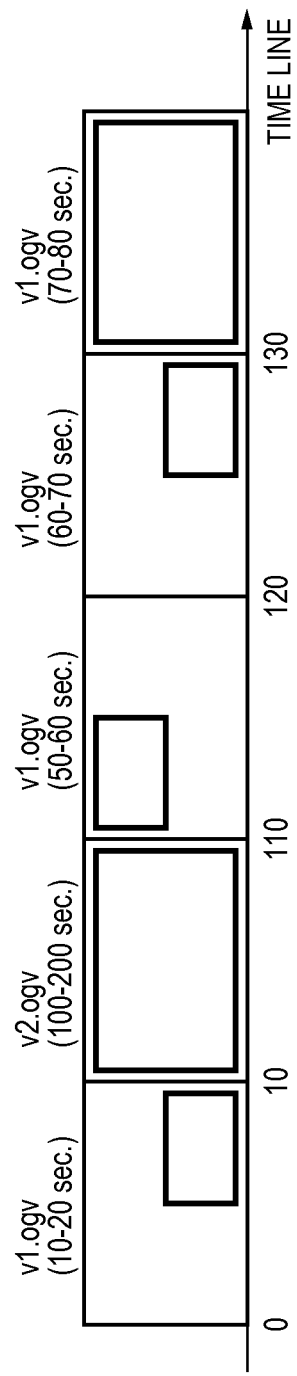

INFORMATION PROCESSING APPARATUS AND METHOD THEREFOR

BACKGROUND OF THE INVENTION

1. Field of the Invention

The present invention relates to information processing in the playing back of video contents.

2. Description of the Related Art

Using a web browser, it is possible to view a video provided by a video distribution service. A user can also use a live video streaming service which allows the streaming of, in real time, a video being captured by the user. Services associated with videos have become familiar to the user. However, video data generally has a large data size. When the user wants to play back only the middle part of a video, it takes a long time to download contents and to start playback.

In recent years, a Media Fragments URI technique (for example, http://www.w3.org/TR/media-frags/) compliant with the World Wide Web Consortium (W3C) standard has been receiving attention. According to this technique, it is possible to obtain only some of the video contents (to be referred to as a fragment video hereinafter) from a server based on a uniform resource identifier (to be referred to as a fragment URI) including a fragment description. If it is possible to obtain a fragment video, the user can obtain only part of a video with a large data size, such as a movie, of his or her interest, and play it back in a short time.

The URI of a video v1.ogv distributed by a host having a name "sample.org" using HTTP (Hyper Text Transfer Protocol) is described as "http://sample.org/v1.ogv". When this URI is designated, the web browser transmits an HTTP GET request to the host "sample.org", and acquires binary data of the video v1.ogv as a response from a server to play it back.

A fragment URI "http://sample.org/v1.org#t=10,20" represents part of the video with a starting point set as 10 sec and an ending point set as 20 sec. When this URI is designated, the web browser extracts a fragment description "#t=10,20", sets the fragment description in an HTTP Range header as follows, and transmits a GET request to the server.

```
GET /v1.ogb HTTP/1.1
Host: sample.org
Accept: video/*
Range: t:npt=10-20
:
```

Upon receiving the request, the server analyzes the value of the Range header of the request, and extracts a description "10-20" indicating part of the video. The server sets, as follows, in a response header "Content-Range-Mapping", the time interval of a fragment video to be transmitted and the byte range of the video to be transmitted, and transmits the binary data of the video to a client (web browser).

```
HTTP/1.1 206 Partial Content
Content-Type: video/ogg
Content-Range-Mapping: {t:npt 10.5-20.5}={bytes 1234-2345/10000}
:
(binary data)
```

Furthermore, it is possible to form a collection of videos including a plurality of fragment videos by combining a plurality of fragment URIs. An HTML description example of a given collection of videos is as follows, the collection of videos is defined using, as a container, a <videos> element belonging to a name space "http://sample.org", and each fragment video is referred to using a <video> element.

```
<html>
    <head><title>sample</title></head>
    <body>
        <x:videos xmlns:x="http:/sample.org">
            <video src="http://sample.org/v1.ogv#t=10,20"/>
            <video src="http://sample.org/v2.ogv#t=100,200"/>
            <video src="http://sample.org/v1.ogv#t=50,60"/>
            <video src="http://sample.org/v1.ogv#t=60,70"/>
            <a href="http://sample-news.org">
                <video src="http://sample.org/v1.ogv#t=70,80"/>
            </a>
        </x:videos>
    </body>
</html>
```

FIG. 1 shows a playback order of the fragment videos. The web browser downloads the fragment videos from the server, and sequentially plays them back as one collection of videos, as shown in FIG. 1.

In the above HTML description example, the fragment videos are individually described even if they have the same video resource. That is, fragment descriptions #10,20, #50,60, and #60,70 are designated for the video v1.ogv. To obtain the fragment videos of the video v1.ogv, therefore, the client transmits an HTTP request to the server three times, and the server also transmits a response to the client three times.

Every time the server receives a request, it needs to appropriately decode the same video according to a codec, and extract a fragment video designated in a Range header. If a collection of videos includes a large number of fragment references which refer to the same video resource, it takes a long time to obtain the fragment videos, thereby causing a time lag in playback of the collection of videos.

SUMMARY OF THE INVENTION

In one aspect, an information processing apparatus comprising: an inputting section, configured to input data described in a markup language; an analyzing section, configured to analyze a uniform resource identifier including a fragment description, which is contained in the data; a determining section, configured to determine, as a result of the analysis, whether there are connectable fragments which refer to the same resource; and a generating section, configured to generate, in a case where the determining section determines that there are connectable fragments which refer to the same resource, a uniform resource identifier by integrating the connectable fragments.

According to this aspect, it is possible to decrease the number of requests to obtain a video by integrating a plurality of fragment references which refer to the same video resource.

Further features of the present invention will become apparent from the following description of exemplary embodiments with reference to the attached drawings.

BRIEF DESCRIPTION OF THE DRAWINGS

FIG. 4 is a flowchart for explaining processing of obtaining fragment videos.

FIG. 5 is a flowchart for explaining details of analysis of a <videos> element VSi.

FIGS. 6A to 6C are tables for explaining a content table example.

FIG. 7 is a flowchart for explaining details of type conversion within a fragment range.

FIG. 8 is a flowchart for explaining details of update of the content table.

FIGS. 11A and 11B are flowcharts for explaining processing of transmitting fragment videos from the server to a client.

FIG. 12 is a flowchart for explaining details of update of the content table.

FIG. 13 is a table for explaining a content table example according to the second embodiment.

FIG. 14 is a flowchart for explaining details of update of the content table.

FIGS. 16A to 16C are tables for explaining a content table example.

FIG. 18 is a view for explaining a video playback state.

FIG. 21 is a flowchart for explaining details of update of a content table according the fifth embodiment.

FIGS. 22A to 22C are tables for explaining a content table example.

FIG. 23 is a view showing a case in which a video is played back according to fragment descriptions shown in FIG. 22A.

DESCRIPTION OF THE EMBODIMENTS

Information processing according to embodiments of the present invention will be described in detail below with reference to the accompanying drawings.

First Embodiment

In the first embodiment, a method of obtaining a video by sending as small a number of requests as possible when the same video is referred to using a plurality of different fragment URIs will be explained.

[System Configuration]

Figure 1:
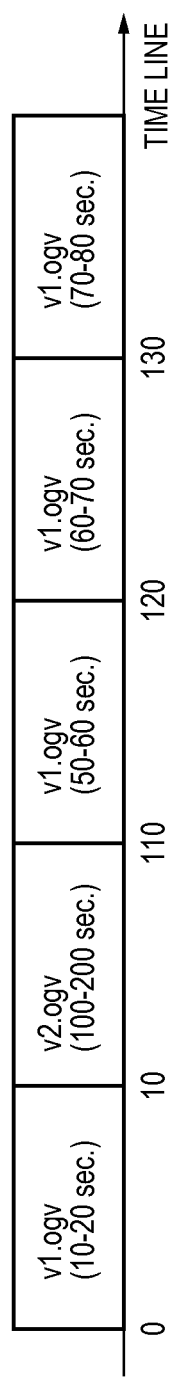
FIG. 1 is a view showing a playback order of fragment videos.
Figure 2:
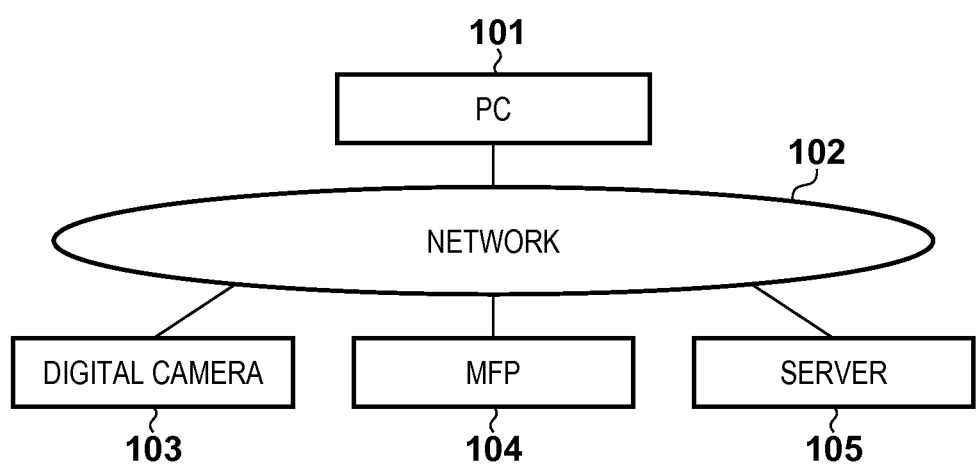
FIG. 2 is a block diagram for explaining an overview of an information processing system according to an embodiment.

An overview of an information processing system according to this embodiment will be described with reference to a block diagram shown in FIG. 2. A computer apparatus (PC) 101 serving as a personal computer is connected to a network 102 such as a local area network (LAN), and executes information processing (to be described later). The network 102 is also connected with a digital camera 103, a multi-functional equipment (MFP) 104, a server 105, and the like. The server 105 functions as a media server which receives a request based on a fragment URI from a client and distributes a fragment video as response data.

[Apparatus Configuration]

Figure 3:
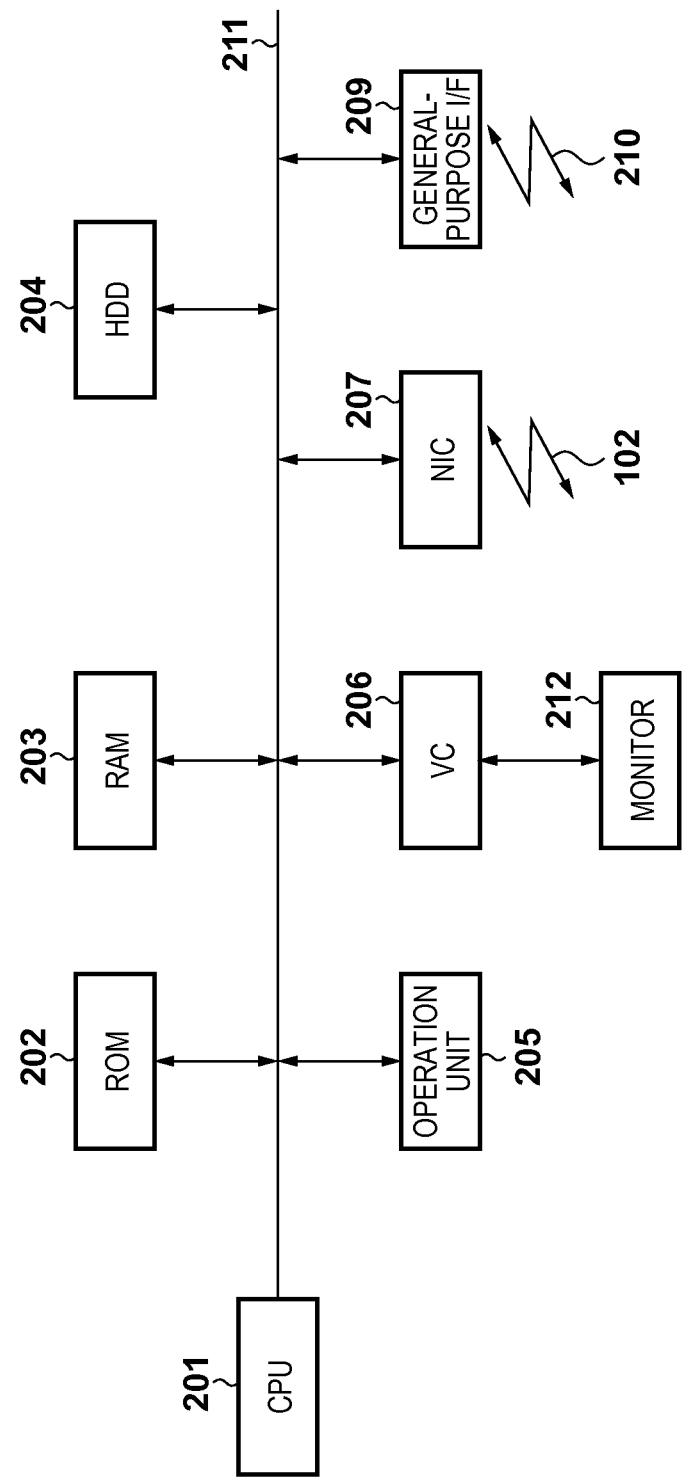
FIG. 3 is a block diagram for explaining the configuration of a PC.

The configuration of the PC 101 will be explained with reference to a block diagram shown in FIG. 3. A microprocessor (CPU) 201 executes an operating system (OS) and various programs stored in a read only memory (ROM) 202 or a hard disk drive (HDD) 204 using a random access memory (RAM) 203 as a work memory, and controls each component (to be described later) via a system bus 211. The programs executed by the CPU 201 include a program associated with fragment video obtaining processing (to be described later).

The CPU 201 displays various images including a user interface (UI) and video on a monitor 212 via a video card (VC) 206. The operator of the PC 101 operates the UI via an operation unit 205 having a keyboard, mouse, and touch panel to input various instructions and data.

A network interface card (NIC) 207 serves as a network interface for connecting the PC 101 with the network 102. A general-purpose interface (I/F) 209 connects the PC 101 with a serial bus 210 such as USB (Universal Serial Bus).

[Processing of Client]

Processing of obtaining a fragment video will be explained with reference to a flowchart shown in FIG. 4. Processing shown in FIG. 4 is implemented by the CPU 201 when the operator instructs to obtain a fragment video.

The CPU 201 obtains data (to be referred to as HTML data hereinafter) described in a markup language (for example, the hyper text markup language (HTML)), which is associated with a fragment video instructed by the operator (S101). Note that the source of the HTML data is the server 105, a server other than the server 105, the HDD 204, or another memory. The CPU 201 analyzes the obtained HTML data (S102), and then obtains a list of <videos> elements contained as descendant elements of a <body> element (S103).

The CPU 201 sets the number of <videos> elements in a variable N (S104), and initializes a counter i to 1 (S105). The CPU 201 then analyzes the ith <videos> element VSi of the <videos> element list to obtain a fragment video (S106), which will be described later. The CPU 201 increments the counter i (S107), and compares the counted value of the counter i with the variable N to determine whether all the <videos> element included in the <videos> element list have been analyzed (S108). If there exists an unanalyzed <videos> element, the process returns to step S106; otherwise, the process ends.

Analysis of <Videos> Element Analysis of the <videos> element VSi (S106) will be described in detail with reference to a flowchart shown in FIG. 5. A content table example will be explained with reference to FIGS. 6A to 6C.

The CPU 201 initializes a variable src to a list data type (S111), and appends, to the end of the variable src, a URI as an attribute value of an src attribute of a <video> element included in the <videos> element VSi and a flag indicating whether the <video> element has link information (S112). The CPU 201 then determines whether all <video> elements included in the <videos> element VSi have been analyzed (S113), and repeats steps S112 and S113 until all the <video> elements are analyzed. Note that the <video> element <video src="http://sample.org/v1.ogv#t=70,80"/> at the 10th line in the above "collection of videos description example" is found to be a descendant element of an <a> element by tracing ancestor elements.

Upon completion of analysis of the video elements included in the <videos> element VSi, the CPU 201 analyzes a protocol, host name, path, fragment type, and fragment range of each URI stored in the variable src (S114). Based on the analysis result, the CPU 201 forms a content table in a predetermined area of the RAM 203 (S115). FIG. 6A shows an example of the content table corresponding to the above "collection of videos description example".

The CPU 201 converts a data type within a corresponding fragment range based on a fragment type (S116), and updates the content table based on fragment information (S117), which will be described in detail later. Then, the CPU 201 transmits fragment video obtaining request data to the server 105 based on the content table (S118), and updates the content table based on a response from the server 105 (S119).

Type Conversion within Fragment Range

Type conversion within a fragment range (S116) will be described in detail with reference to a flowchart shown in FIG. 7. Note that processing shown in FIG. 7 corresponds to that for one line (one record) of the content table. The CPU 201, therefore, executes the processing shown in FIG. 7 the number of times which is equal to that of records.

The CPU 201 determines a fragment type (S301). If the fragment type is "t" (a fragment range indicates a time), the CPU 201 initializes a floating point type variable list (S302). The CPU 201 then divides character string data within the fragment range with a character "," (S303). The CPU 201 sequentially converts character string data into floating point type data, and appends them to the variable list (S304).

If the fragment type is a space (for example, "xywh") (a fragment range indicates a space), the CPU 201 initializes a floating point type variable list (S305). The CPU 201 then divides character string data within the fragment range with a character "," (S306). The CPU 201 sequentially converts character string data into floating point type data, and appends them to the variable list (S307).

If the fragment type is neither a time nor a space, the CPU 201 considers the fragment type as "track", and initializes a string data type variable list (S308). The CPU 201 then divides a character string within a corresponding fragment range with a character "&" (S309). The CPU 201 divides each character string with a character "=", and appends a character string after "=" to the variable list (S310).

In the content table shown in FIG. 6A, all fragment types are "t". All fragment ranges, therefore, are converted into floating point type data.

Update of Content Table (S117)

Update of the content table (S117) will be explained in detail with reference to a flowchart shown in FIG. 8.

The CPU 201 sets the number of records of the content table in a variable M (S401), and initializes a counter j to 1 (S402). The CPU 201 compares the counted value of the counter j with the variable M (S403). If j<M, the process advances to step S404. If j=M, the process ends.

If j<M, the CPU 201 determines a link flag at the jth row (record j) of the content table and a link flag at the (j+1)th row (record j+1) succeeding record j (S404). If the link flags are affirmative (true), the process advances to step S411.

If the link flags of records j and j+1 are negative (false), the CPU 201 determines whether the reference resource of records j and j+1 are identical (S405), and also determines whether fragment types are "t" (S406). Furthermore, the CPU 201 determines whether the ending point of the fragment range of record j coincides with the starting point of the fragment range of record j+1 (S407). Note that a reference resource is represented by a set of a protocol, host name, and path. If the reference resources are different from each other, at least one of the fragment types is not "t", or the ending point and the starting point of the respective fragment ranges do not coincide with each other, the process advances to step S411.

If the CPU 201 determines that the reference resources of records j and j+1 are identical, the fragment types are "t", and the ending point and the starting point of the respective fragment ranges coincide with each other, the ending point of the fragment range of record j is connectable to the starting point of the fragment range of record j+1. In this case, the CPU 201 changes the ending point of the fragment range of record j as one of the successive records to the ending point of the fragment range of record j+1 as the other one of the successive records (S408). The CPU 201 then deletes record j+1 from the content table (S409), and decrements the variable M (S410).

The CPU 201 increments the counter j (S411), and returns the process to step S403.

That is, if the reference resources are identical, the fragment types are "t", and the ending point and the starting point of the respective fragment ranges coincide with each other, the CPU 201 includes the fragment range of record j+1 in that of record j, and deletes one record from the content table.

In records 3 and 4 of the content table shown in FIG. 6A, for example, link flags are negative, reference resources are identical, fragment types are "t", and the ending point of the fragment range of record 3 coincides with the starting point of the fragment range of record 4. With the above-described processing, as shown in FIG. 6B, the fragment range of record 3 is changed from [50, 60] to [50, 70], and record 4 is deleted. In records 3 and 4 of FIG. 6B, reference resources are identical, fragment types are "t", and the ending point of the fragment range of record 3 coincides with the starting point of the fragment range of record 4. Since, however, the link flag of record 4 is affirmative (link information is held), the fragment ranges are not integrated.

Fragment Video Obtaining Request

The fragment video obtaining request (S118) will be described in detail with reference to flowcharts shown in FIGS. 9A and 9B.

The CPU 201 sets the number of records of the content table in a variable M (S501), initializes a counter i to 1 (S502), and initializes a transmission completion flag corresponding to the reference resource of each record to false (S503). The CPU 201 compares the counted value of the counter i with the variable M (S504). If i<M, the process advances to step S505. If i=M, the process ends.

If i<M, the CPU 201 initializes a variable index to a list data type (S505), sets the number of negative transmission completion flags in a variable j (S506), and appends the fragment range of record j to the variable index (S507). Then, the CPU 201 sets j−1 in a variable k (S508), and determines the variable k (S509). If k=0, the process advances to step S515.

If k>0, the CPU 201 determines the transmission completion flag corresponding to record k (S510), and also determines the reference resources of records k and j (S511). If the transmission completion flag of record k is affirmative or the reference resources of records k and j are different from each other, the process advances to step S514.

If the transmission completion flag of record k is negative and the reference resources of records k and j are identical, the CPU 201 appends the fragment range of record k to the variable index (S512). Then, the CPU 201 inverts the transmission completion flag corresponding to record k (sets the flag to true) (S513), decrements the variable k (S514), and returns the process to step S509.

If k=0, the CPU 201 transmits fragment video obtaining request data to the server 105 based on the fragment range of each record stored in the variable index (S515). The CPU 201 increments the counter i (S516), and returns the process to step S504.

Referring to the content table shown in FIG. 6B, contents of fragment video obtaining request data for the video v1.ogv are as follows. That is, 10-20 sec, 50-70 sec, and 70-80 sec are designated as fragment ranges of the video v1.ogv using a Range header.

```
GET /v1.ogv HTTP/1.1
Host: sample.org
Accept: video/*
Range: t:npt=10-20,50-70,70-80
    :
```

[Processing of Server]

Analysis of Fragment Video Obtaining Request Data

Figure 10:
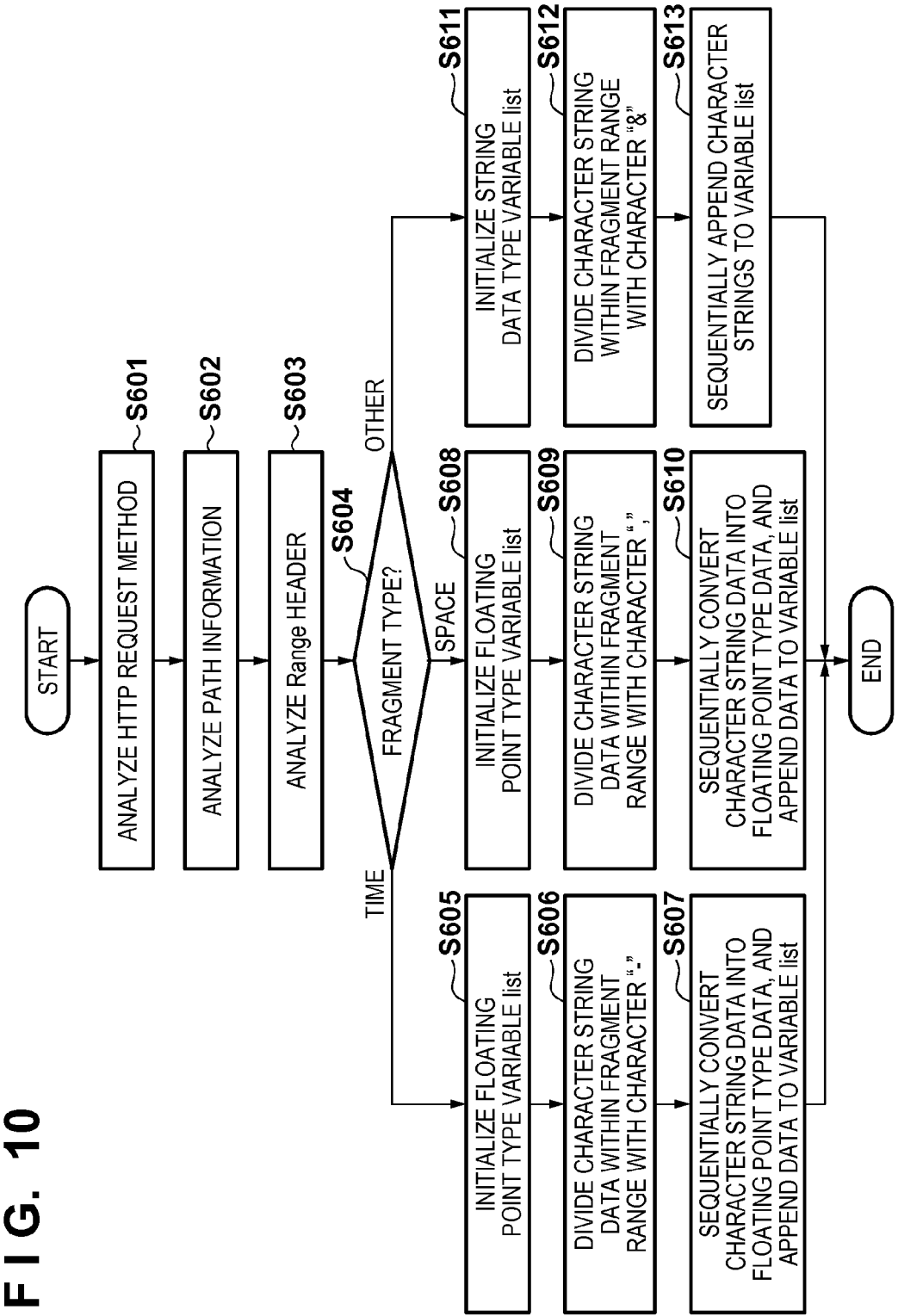
FIG. 10 is a flowchart for explaining processing of analyzing fragment video obtaining request data by a server.

Processing of analyzing fragment video obtaining request data by the server 105 will be explained with reference to a flowchart shown in FIG. 10. Note that the CPU of the server 105 executes processing shown in FIG. 10. Assume, however, that the server 105 executes the processing.

Upon receiving fragment video obtaining request data, the server 105 analyzes an HTTP request method (S601), analyzes path information (S602), analyzes a Range header (S603), and determines a fragment type (S604).

If the fragment type is associated with a time, the server 105 initializes a variable list to a floating point type list (S605). The server 105 divides character string data within a fragment range with a character "-" (S606). The server 105 sequentially converts character string data into floating point type data, and appends them to the variable list (S607).

If the fragment type is associated with a space, the server 105 initializes a variable list to a floating point type list (S608). The server 105 divides character string data within a fragment range with a character "," (S609). The server 105 sequentially converts character string data into floating point type data, and appends them to the variable list (S610).

If the fragment type is neither a time nor a space, the server 105 considers the fragment type as "track", and initializes a variable list to a string data type list (S611). The server 105 then divides character string data within a fragment range with a character "&" (S612), and sequentially appends the character string data to the variable list (S613).

With the above-described processing, the server 105 can specify a fragment video requested by the client.

Processing of Transmitting Fragment Video to Client

Figure 11B:
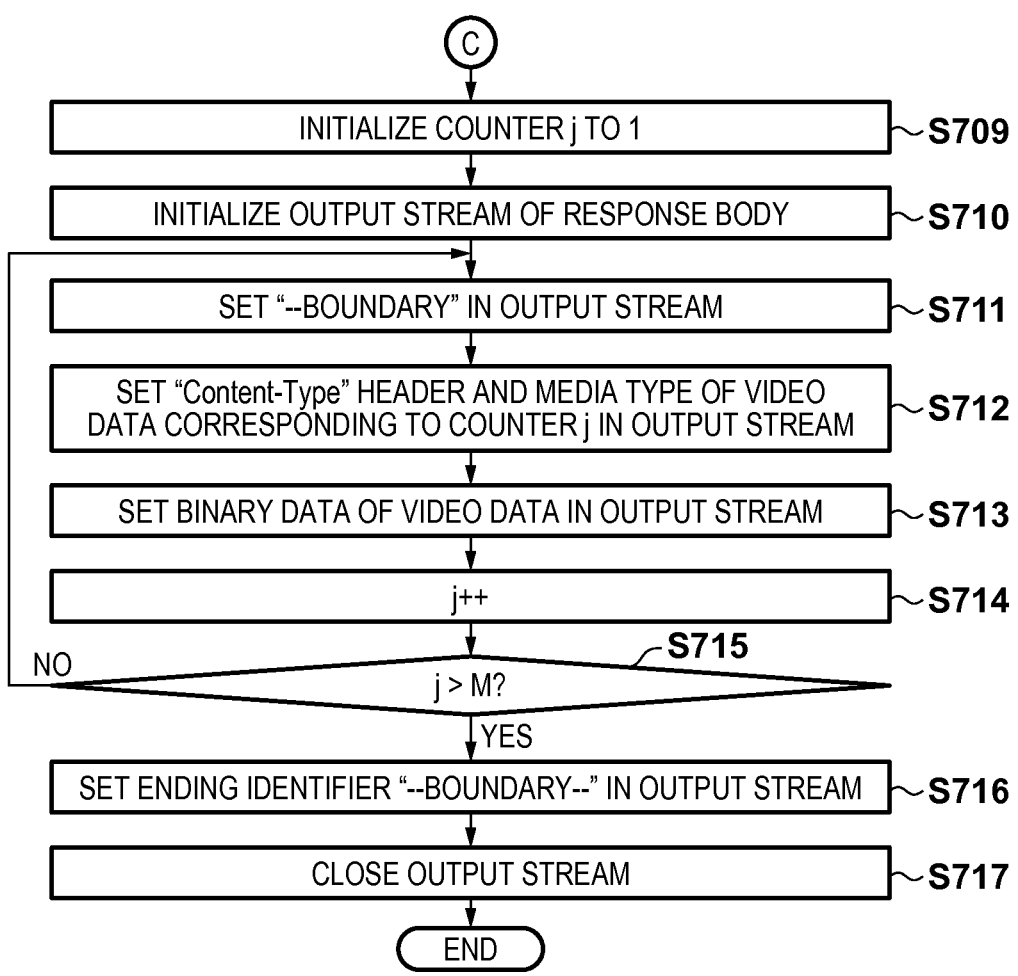

Processing of transmitting a fragment video from the server 105 to the client will be described with reference to flowcharts shown in FIGS. 11A and 11B.

The server 105 stores, in a list data type variable mapping, a list of sets of a fragment type, a fragment range, a byte range, a media type, and an input stream of a fragment video which have been extracted from the fragment video obtaining request data (S701). The server 105 generates an identifier for multi-part transmission, and sets "Content-Type" in a response header (S702). In this embodiment, by assuming that the identifier for multi-part transmission is "BOUNDARY", "multipart/byteranges; boundary=BOUNDARY" is obtained as the value of the Content-Type header.

The server 105 sets "Content-Range-Mapping" in the response header (S703), sets the list size of the variable mapping in a variable M (S704), and initializes a counter j to 1 (S705). The server 105 appends, as the value of the Content-Range-Mapping header, a fragment type, a fragment range, and a byte range which are contained in the list of the variable mapping and correspond to the counter j (S706).

The server 105 increments the counter j (S707), and compares the counted value of the counter j with the variable M (S708). If j M, the process returns to step S706. That is, by repeating step S706, all pieces of fragment information stored in the variable mapping are set in the Content-Range-Mapping header.

When j>M, the server 105 initializes the counter j to 1 (S709), and initializes an output stream of a response body (S710). The server 105 then sets a character string "- -" and the multi-part identifier "BOUNDARY" in the output stream (S711). Furthermore, the server 105 sets the media type of video data corresponding to the counter j in the output stream together with the "Content-Type" header (S712), and also sets the binary data of the video data in the output stream (S713). That is, by repeating steps S712 and S713, all fragment videos stored in the variable mapping are set in the output stream.

The server 105 increments the counter j (S714), and compares the counted value of the counter j with the variable M (S715). If j≤M, the process returns to step S711. When j>M, the server 105 sets, as a multi-part ending identifier, a character string "- -", the identifier "BOUNDARY", and a character string "- -" in the output stream (S716), and closes the output stream (S717).

An example of response data of the server to the above-described fragment video obtaining request data for the video v1.ogv is as follows.

```
HTTP/1.1 206 Partial Content
Content-Type: multipart/byteranges;
boundary=BOUNDARY
    Content-Range-Mapping:
        {t:npt 10-20}={bytes 1000-2000/10000}
        {t:npt 50-70}={bytes 5000-7000/10000}
        {t:npt 70-80}={bytes 7000-8000/10000}
    --BOUNDARY
    Content-Type: video/ogg
    Content-Range: 1000-2000/10000
    (binary data)
    --BOUNDARY
    Content-Type: video/ogg
    Content-Range: 5000-7000/10000
    (binary data)
    --BOUNDARY
    Content-Type: video/ogg
    Content-Range: 7000-8000/10000
    (binary data)
    --BOUNDARY--
```

[(Continued) Processing of Client]

Update of Content Table (S119)

The CPU 201 analyzes the above server response to update the content table (S119). Update of the content table (S119) will be explained in detail with reference to a flowchart shown in FIG. 12.

The CPU 201 analyzes the Content-Range-Mapping header of the server response (S801), and stores, in a list data type variable range, a list of sets of a fragment type, a fragment range, and a byte range at each row (S802). Then, the CPU 201 adds byte range information to the content table shown in FIG. 6B based on the fragment ranges stored in the variable index and the list of the variable range (S803). Furthermore, the CPU 201 associates the stream data of the response body with the fragment ranges based on the fragment ranges stored in the variable index (S804).

FIG. 6C shows a content table after the content table (FIG. 6B) is updated (S119) based on the server response. That is, the CPU 201 associates byte ranges 1000-2000/10000, 5000-7000/10000, and 7000-8000/10000 with the fragment ranges [10, 20], [50, 70], and [70, 80] of the video v1.ogv, respectively. The CPU 201 also associates, as a stream instance, "stream1" indicating the stream of the response body with each of the fragment ranges.

A description of a fragment video obtaining request (S515) for a video v2.ogv corresponding to another reference resource and processing of the server 105 has been omitted above. The fragment video obtaining request data for the video v2.ogv is as follows.

```
GET /v2.ogv HTTP/1.1
Host: sample.org
Accept: video/*
Range: t:npt=100-200
    :
```

Response data from the server is as follows.

```
HTTP/1.1 206 Partial Content
Content-Type: video/ogg
Content-Range-Mapping: {t:npt 100-200}={bytes
10000-20000/100000}
    :
(binary data)
```

Similarly to the video v1.ogv, the CPU 201 associates a byte range 10000-20000/100000 with a fragment range [100, 200] of the video v2.ogv. The CPU 201 also associates, as a stream instance, "stream2" indicating the stream of a response body with the fragment range.

The CPU 201 obtains video data from each stream instance based on the content table shown in FIG. 6C, and plays back a collection of videos by sequentially displaying the video data within, for example, the window of a web browser displayed on the monitor 212.

In the example shown in FIGS. 6A to 6C, the number of requests to obtain a video decreases by 1. Depending on the structure of fragment videos to be obtained, however, it is possible to further decrease the number of requests. That is, it is possible to decrease the number of fragment video requests when the client requests fragment videos of the server. Thus, by decreasing the number of requests/responses between the client and the server, it is possible to prevent occurrence of a time lag in playback of a collection of videos, thereby improving the performance of video streaming.

Second Embodiment

Information processing according to the second embodiment of the present invention will be explained below. Note that in the second embodiment, the same reference numerals are given to the same components as in the first embodiment and a detailed description thereof will be omitted.

Assume that HTML data associated with obtained fragment videos is as follows. That is, with respect to child elements of a <videos> element as a container, the third and fourth <video> elements have the same reference resource, and there is a non-playback time of 5 sec between their fragment ranges. According to the processing described in the first embodiment, if the ending point of the fragment range of a <video> element coincides with the starting point of the fragment range of a subsequent <video> element, the <video> elements are integrated. In the following HTML data, however, the third and fourth <video> elements are not integrated due to a non-playback time of 5 sec.

```
<html>
    <head><title>sample</title></head>
    <body>
        <x:videos xmlns:x="http:/sample.org">
            <video src="http://sample.org/v1.ogv#t=10,20"/>
            <video src="http://sample.org/v2.ogv#t=100,200"/>
            <video src="http://sample.org/v1.ogv#t=50,60"/>
            <video src="http://sample.org/v1.ogv#t=65,70"/>
        </x:videos>
    </body>
</html>
```

In the second embodiment, a case in which if a non-playback time is shorter than a threshold, corresponding <video> elements are integrated will be described. Note that the non-playback time threshold may be constant or set by the user.

A content table example according to the second embodiment will be explained with reference to FIG. 13. FIG. 13 shows an example of a content table corresponding to the above "collection of videos description example".

Update of the content table (S117) will be described in detail with reference to a flowchart shown in FIG. 14. Note that the same reference symbols are given to the same processes as in the first embodiment shown in FIG. 8 and a detailed description thereof will be omitted.

A CPU 201 sets a non-playback time threshold in a variable D (S901), and executes the same processing in steps S401 to S406 as in the first embodiment. If, for records j and j+1, link flags are negative, reference resources are identical, and fragment types are "t", the CPU 201 calculates the difference between an ending point $T_je$ of the fragment range of record j and a starting point $T_{j+1}b$ of the fragment range of record j+1 (S902). Note that the difference corresponds to a non-playback time Td. Then, the CPU 201 compares the non-playback time Td with the variable D (S903). If Td>D, the process advances to step S411 (records j and j+1 are not integrated). If Td≤D, the CPU 201 determines that the ending point of the fragment range of record j is connectable to the starting point of the fragment range of record j+1, and advances the process to step S408 (records j and j+1 are integrated).

If the processing shown in FIG. 14 is executed on the assumption that the non-playback time threshold is 5 sec, the third and fourth <video> elements in the above HTML data are integrated, thereby decreasing the number of requests to obtain the video. That is, assume that a plurality of fragment videos having the same reference resource exist at short non-playback intervals. In this case, by appropriately setting the non-playback time threshold, it is possible to integrate the plurality of fragment videos to decrease the number of requests.

Third Embodiment

Information processing according to the third embodiment of the present invention will be explained below. Note that in the third embodiment, the same reference numerals are given to the same components as in the first and second embodiments and a detailed description thereof will be omitted.

In the third embodiment, a case in which for a plurality of videos in each of which a fragment (to be referred to as a space fragment hereinafter) associated with a space has been designated, obtaining request data for the spaces is transmitted to a server 105, and thus the videos are obtained by sending a smaller number of requests will be described.

An example of HTML data including videos in which space fragments have been designated is as follows. The relationship between a description of the HTML data and the space fragments according to the third embodiment will be explained with reference to FIG. 15A.

```
<html>
    <head>sample</head>
    <body>
        <video
  src="http://sample.org/v1.ogv#xywh=160,120,320,240"/>
        <video
  src="http://sample.org/v1.ogv#xywh=170,360,320,240"/>
    </body>
</html>
```

Figure 15A:
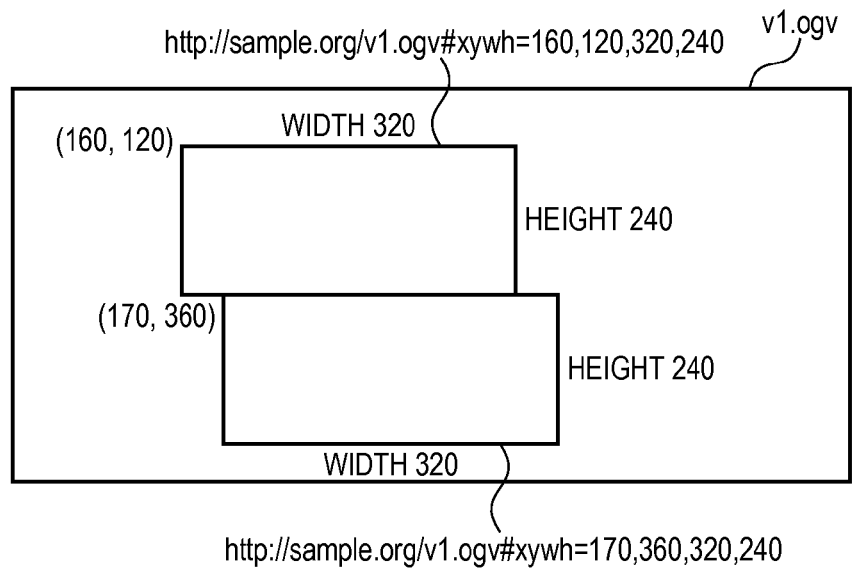
FIGS. 15A and 15B are views for explaining the relationship between an HTML data description and space fragments, and fragment videos displayed on the monitor of a client, respectively according to the third embodiment.

A description "#xywh=x,y,w,h" indicates extracting a rectangular image which has a width w in the x direction and a height h in the y direction from coordinates (x, y) on the assumption that the upper left corner of the image is an origin. Upon receiving such a request based on a URI, the server extracts, from the video v1.ogv, a video of a rectangular region with upper left coordinates (x, y) and lower right coordinates (x+w, y+h) as shown in FIG. 15A, and transmits it to a client.

Figure 15B:
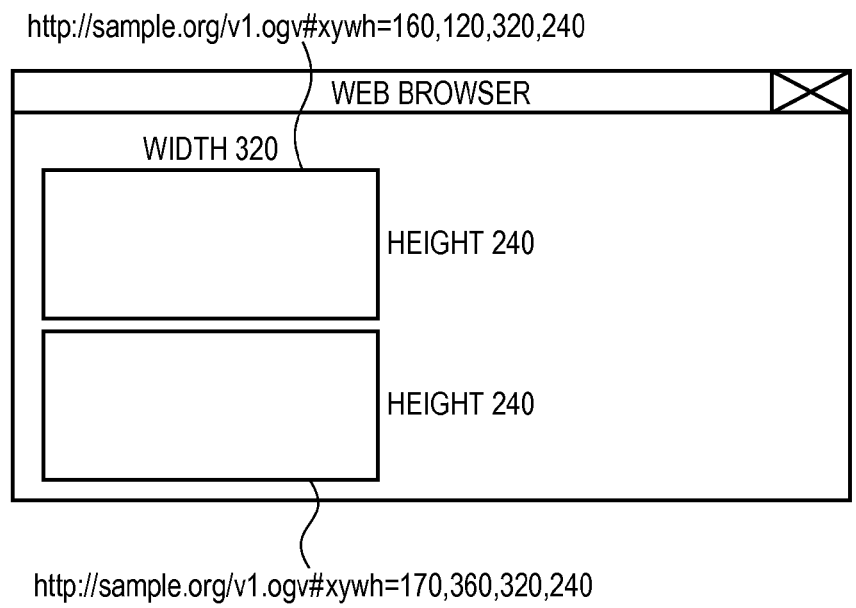

Fragment videos displayed on the monitor of the client will be described with reference to FIG. 15B. That is, the fragment videos designated in the <video> elements are displayed within the window of a web browser displayed on the monitor of the client.

A content table example will be explained with reference to FIGS. 16A to 16C. FIG. 16A shows an example of a content table corresponding to the above "collection of videos description example".

Figure 17:
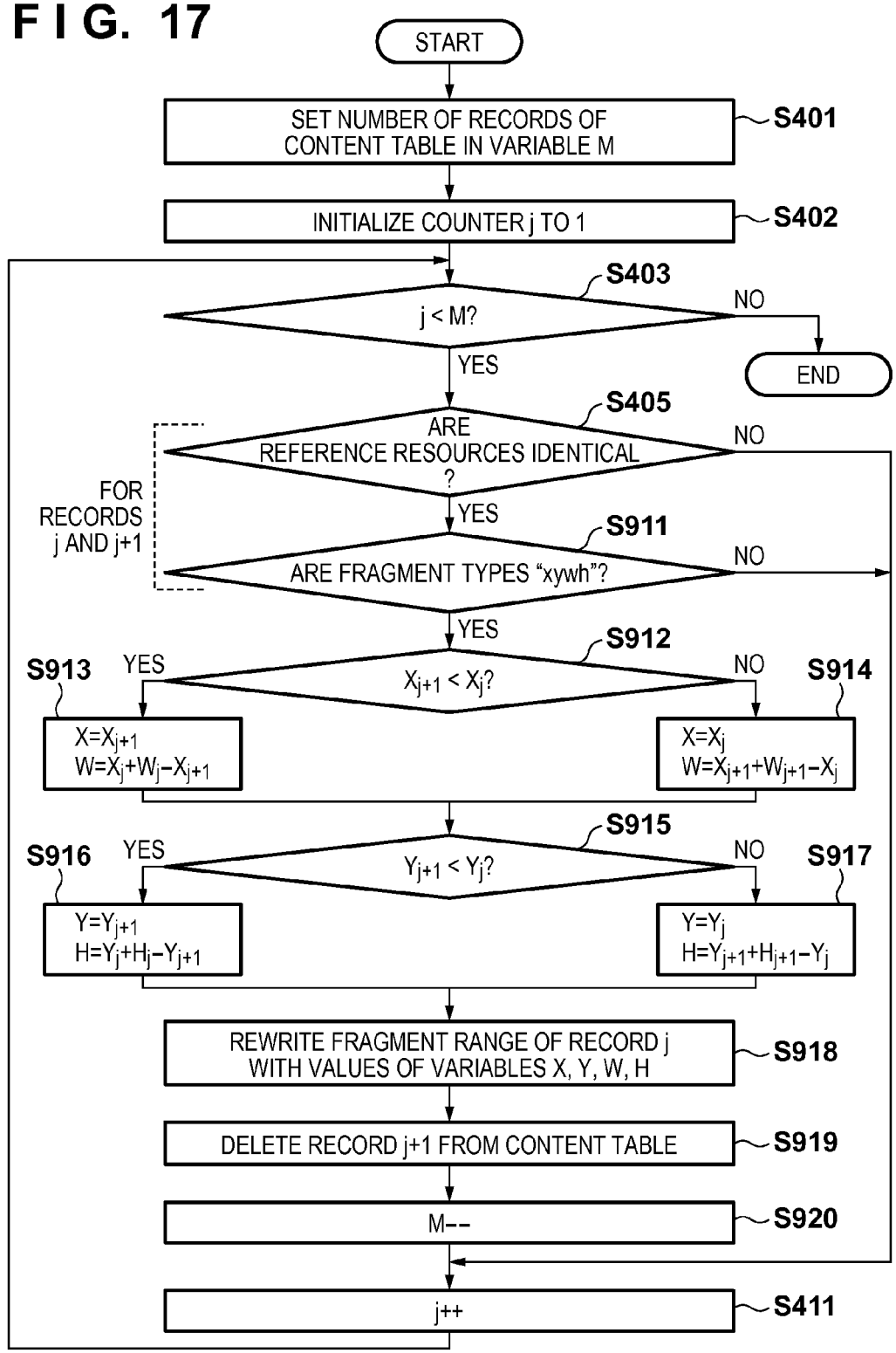
FIG. 17 is a flowchart for explaining details of update of the content table.

Update of the content table (S117) will be described in detail with reference to a flowchart shown in FIG. 17. Note that the same reference symbols are given to the same processes as in the first embodiment shown in FIG. 8 and a detailed description thereof may be omitted.

A CPU 201 sets the number of records of the content table in a variable M (S401), and initializes a counter j to 1 (S402). The CPU 201 compares the counted value of the counter j with the variable M (S403). If j<M, the process advances to step S404. If j=M, the process ends.

If j<M, the CPU 201 determines whether the reference resources of records j and j+1 of the content table are identical (S405), and also determines whether the fragment types of records j and j+1 are "xywh" (S911). If the reference resources are different from each other or at least one of the fragment types is not "xywh", the process advances to step S411.

If the reference resources of records j and j+1 are identical and the fragment types are "xywh", the CPU 201 executes the following processing (steps S912 to S920).

```
if (X_{j+1} < X_j) {                      ...(S912)
    X = X_{j+1};
    W = X_j + W_j - X_{j+1};              ...(S913)
} else {
    X = X_j;
    W = X_{j+1} + W_{j+1} - X_j;          ...(S914)
}
if (Y_{j+1} < Y_j) {                      ...(S915)
    Y = Y_{j+1};
    H = Y_{j+1} + H_j - Y_{j+1};          ...(S916)
} else {
    Y = Y_j;
```

$H = Y_{j+1} + H_{j+1} - Y_j;$ ...(S917)
}

Note that $X_j$ represents the x coordinate of the fragment range of record j, $W_j$ represents the width of the fragment range of record j, $H_j$ represents the height of the fragment range of record j, $X_{j+1}$ represents the x coordinate of the fragment range of record j+1, $W_{j+1}$ represents the width of the fragment range of record j+1, and $H_{j+1}$ represents the height of the fragment range of record j+1.

The CPU 201 rewrites the fragment range of record j with the values of the variables X, Y, W, and H (S918), deletes record j+1 from the content table (S919), and decrements the variable M (S920).

The CPU 201 increments the counter j (S411), and returns the process to step S403.

That is, if the reference resources are identical and the fragment types are "xywh", the CPU 201 includes the fragment range of record j+1 in that of record j, and deletes one record from the content table.

If the above-described processing is executed for the content table shown in FIG. 16A, the fragment ranges of records 1 and 2 are integrated and the content table is changed to that shown in FIG. 16B. Then, the following fragment video obtaining request data is transmitted to the server 105.

```
GET /v1.ogv HTTP/1.1
Host: sample.org
Accept: video/*
Range: xywh=160,120,330,480
    :
```

An example of response data from the server to the above fragment video obtaining request data is as follows.

```
HTTP/1.1 206 Partial Content
    Content-Type: multipart/bytesranges;
boundary=BOUNDARY
    Content-Range: bytes 1000-2000/10000
    Content-Range-Mapping: xywh=160,120,330,480
    :
(binary data)
```

The CPU 201 analyzes the above server response to update the content table (S119). FIG. 16C shows a content table obtained by updating (S119) the content table (FIG. 16B) based on the server response. That is, the CPU 201 associates a byte range 1000-2000/10000 with a fragment range [160, 120, 330, 480] of the video v1.ogv. The CPU 201 also associates, as a stream instance, "stream1" indicating the stream of the response body with the fragment range.

A video playback state will be described with reference to FIG. 18. The CPU 201 obtains video data from the stream instance based on the content table shown in FIG. 16C. By displaying the video data in, for example, a region with a size of 330×480 within the window of a web browser displayed on a monitor 212, the video is played back.

As described above, for a plurality of videos in which space fragments have been designated, by transmitting obtaining request data for the spaces to the server 105, it is possible to obtain the videos by sending a smaller number of requests.

Fourth Embodiment

Information processing according to the fourth embodiment of the present invention will be explained below. Note that in the fourth embodiment, the same reference numerals are given to the same components as in the second embodiment and a detailed description thereof will be omitted.

In the second embodiment, a case in which a non-playback time threshold is constant or set by the user has been described. In the fourth embodiment, a case in which a non-playback time threshold is determined based on contents of fragment videos will be explained.

Figure 19:
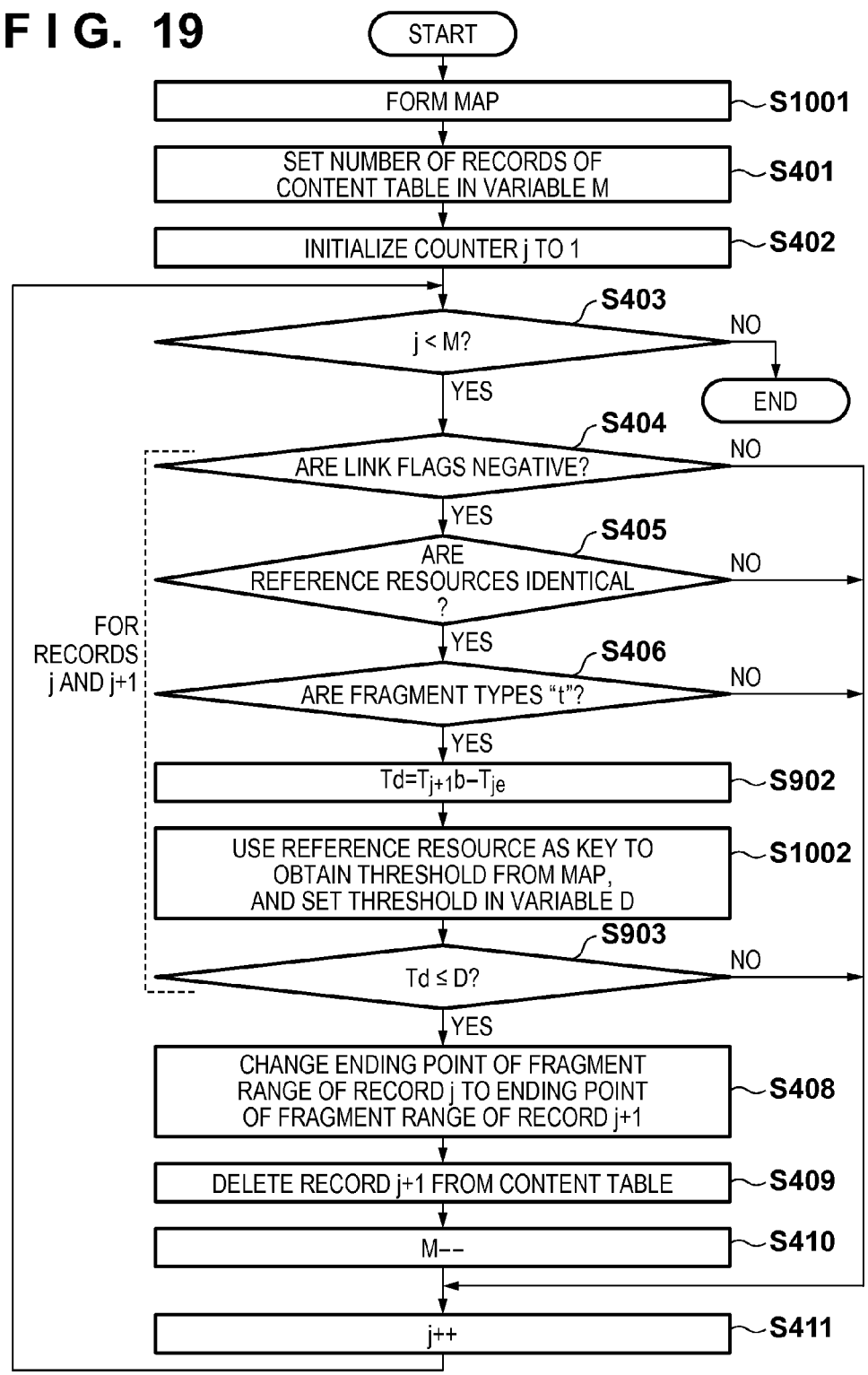
FIG. 19 is a flowchart for explaining details of update of a content table according to the fourth embodiment.

A procedure of updating a content table according to the fourth embodiment will be described in detail with reference to a flowchart shown in FIG. 19. Note that the same reference symbols are given to the same processes as in the first embodiment shown in FIG. 8 and the same processes as in the second embodiment shown in FIG. 14, and a detailed description thereof will be omitted.

A CPU 201 forms a map indicating a non-playback time threshold for each resource of the content table (S1001). Processing of forming a map (S1001) will be described in detail with reference to a flowchart shown in FIG. 20.

The CPU 201 sets the number of records of the content table in a variable L (S1101). The CPU 201 initializes a map to have, as a key, a character string obtained by combining the host name and path of a resource of the content table, and the time of the resource as a value (S1102). Note that the map is a table for managing a value to be a pair with a key which has a unique value. If a key is input to the map, it is possible to obtain a value paired with the key. If a key and a value are input to the map, it is possible to update the table managed as the map with the key and the value.

The CPU 201 initializes a counter j to 1 (S1103), and determines whether the value of the counter j is equal to or smaller than the variable L (S1104). If the value of the counter j is equal to or smaller than the value L (j≤L), the CPU 201 determines the jth link flag (S1105), and then determines whether the jth fragment type is a time "t" (S1106).

If the jth link flag is negative and the jth fragment type is a time "t", the CPU 201 obtains a time $T_j$ associated with the jth resource from the map (S1107). The CPU 201 adds the fragment time of the jth resource to the time $T_j$ (S1108). Then, the CPU 201 updates the map using a pair of the jth resource and the time $T_j$ (S1109), increments the counter j (S1110), and returns the process to step S1104.

If the jth link flag is affirmative or the jth fragment type is not a time "t", the CPU 201 increments the counter j (S1110), and returns the process to step S1104.

In step S1104, if the value of the counter j is larger than the variable L (j>L), the CPU 201 multiplies the time $T_j$ associated with each resource of the map by a weighting factor of 0 to 1, and updates the contents of the map (S1111).

Figure 20:
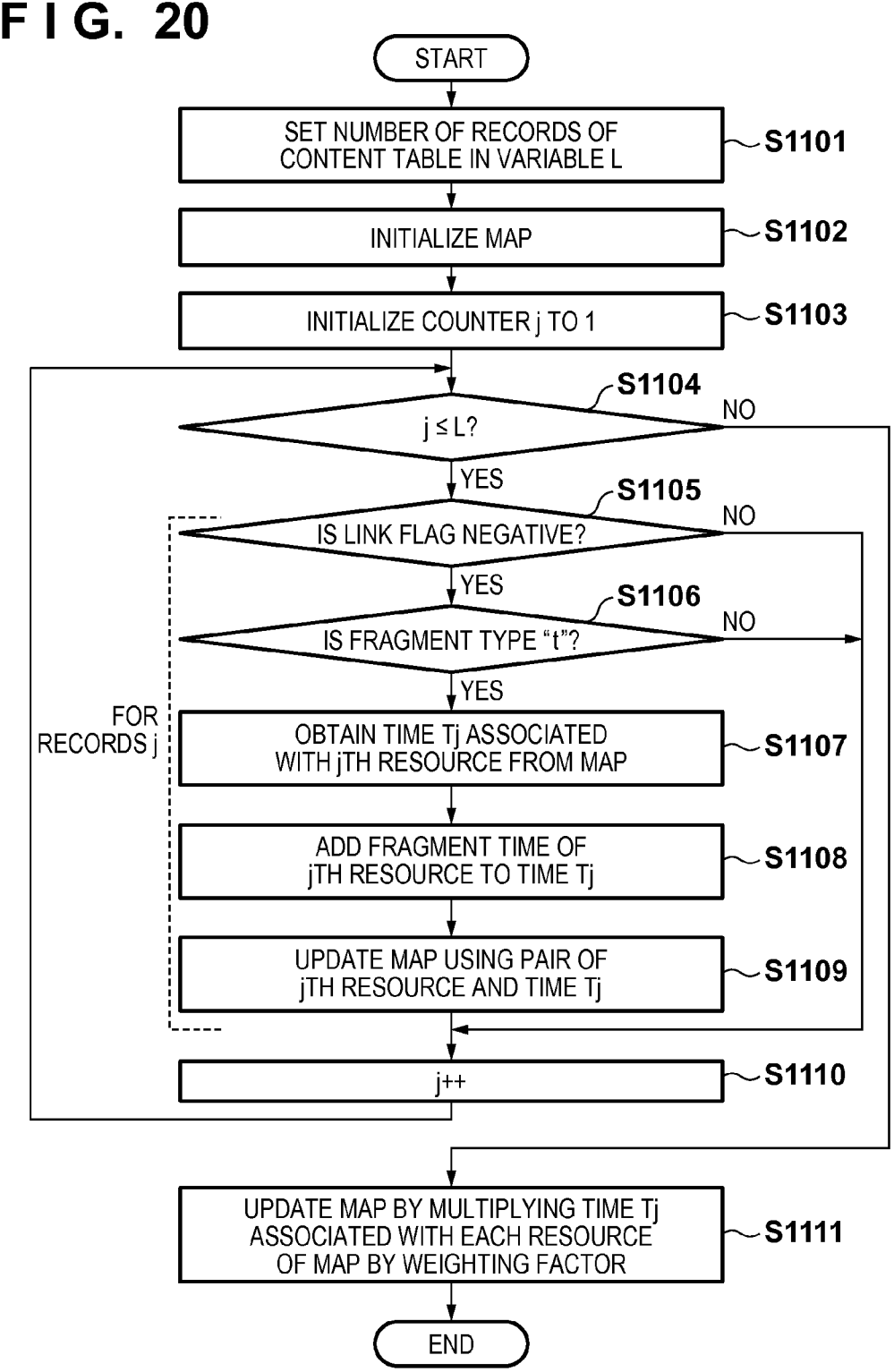
FIG. 20 is a flowchart for explaining processing of dynamically obtaining a non-playback time threshold according to the fourth embodiment.

When the above processing shown in FIG. 20 ends, creation of the map indicating a non-playback time threshold associated with each resource of the content table is completed. Referring back to the flowchart shown in FIG. 19, processing in steps S401 to S902 is the same as that in the second embodiment, and a detailed description thereof will be omitted.

When processing in step S902 ends, the CPU 201 uses, as a key, a character string obtained by combining the host name and path of a reference resource to obtain the threshold of the resource from the map, and sets it in a variable D (S1002). The CPU 201 compares the set variable D with the non-playback time Td (S903). As in the first and second embodiments, if the non-playback time Td is equal to or smaller than the variable D (Td≤D), the CPU 201 executes processing in steps S408 to S410 to combine records j and j+1; otherwise, the CPU 201 does not combine records j and j+1.

As described above, by determining a non-playback time threshold based on contents of fragment videos, it is possible to decrease the number of requests if there is no big influence on the appearance of fragment videos.

Fifth Embodiment

Information processing according to the fifth embodiment of the present invention will be explained below. Note that in the fifth embodiment, the same reference numerals are given to the same components as in the third embodiment and a detailed description thereof will be omitted.

In the third embodiment, for a plurality of videos in each of which a space fragment has been designated, obtaining request data including the spaces is transmitted to a server, thereby decreasing the number of requests. In the fifth embodiment, a case in which the number of requests decreases only when a difference between the space region (FIG. 15A) of original fragment videos and the space region (FIG. 18) of an integrated fragment video falls within a predetermined range (there is no big influence on the appearance of the fragment videos) will be described.

In other words, in the third embodiment, when obtaining a plurality of fragment regions at once, the appearance of original fragment videos in playback may significantly change. In this case, in the fifth embodiment, the appearance is maintained by not obtaining the plurality of fragment regions at once.

Update of a content table (S117) according to the fifth embodiment will be described in detail with reference to a flowchart shown in FIG. 21. Note that the same reference symbols are given to the same processes as in the third embodiment shown in FIG. 17, and a detailed description thereof will be omitted.

Upon completion of processing in steps S401 to S405 and S911 to S917, the CPU 201 calculates $S1=W_j \times H_j + W_{j+1} \times H_{j+1}$ and $S2=W \times H$ (S1201), and compares the value S1 with a value k·S2 (S1202). Note that k represents a weighting factor of 0 to 1. If S1>k·S2, the CPU 201 executes processing in steps S918 to S920 as in the third embodiment, and rewrites the fragment range of record j with the values of variables X, Y, W, and H. Alternatively, if S1≤k·S2, the process advances to step S411 without updating the fragment region of record j.

That is, it is possible to decrease the number of requests only when the difference between the space region of original fragment videos and the space region of an integrated fragment video falls within a predetermined range.

Sixth Embodiment

Information processing according to the sixth embodiment of the present invention will be explained below. Note that in the sixth embodiment, the same reference numerals are given to the same components as in the first and third embodiments and a detailed description thereof will be omitted.

In the first embodiment, a plurality of videos in which time fragments have been designated are targeted. In the third embodiment, a plurality of videos in which space fragments have been designated are the target. In the sixth embodiment, a method of obtaining, when a fragment video uses a URI which uses both a time fragment description and a space fragment description, a video by sending a smaller number of requests will be described.

FIG. 22A shows an example of a content table associated with each video resource included in a fragment video. In a fragment description shown in FIG. 22A, both a time fragment description and a space fragment description are used.

FIG. 23 shows a case in which a video is played back according to the fragment descriptions shown in FIG. 22A. That is, a video formed by partial videos based on time fragment descriptions and space fragment descriptions is played back. Note that each rectangular region indicated by thick solid lines in FIG. 23 represents the position and ratio of an extracted partial video with respect to an original video resource. Referring to FIG. 22A, each of "v2.ogv" of record 2 and "v1.ogv" of record 5 does not include a space fragment description, and refers to the entire space of the original video resource.

Figure 24A:
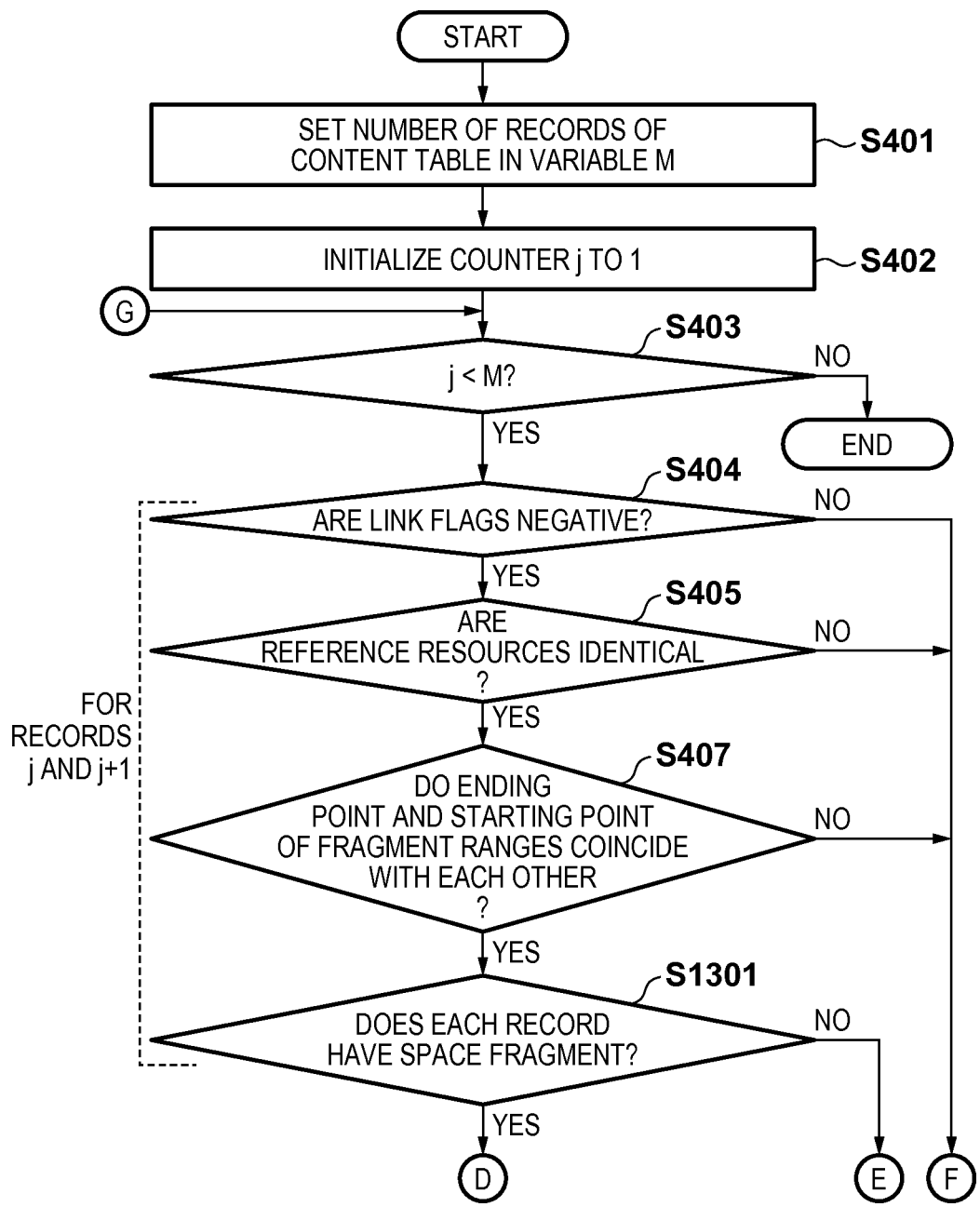
FIGS. 24A and 24B are flowcharts for explaining details of update of a content table according to the sixth embodiment.
Figure 24B:
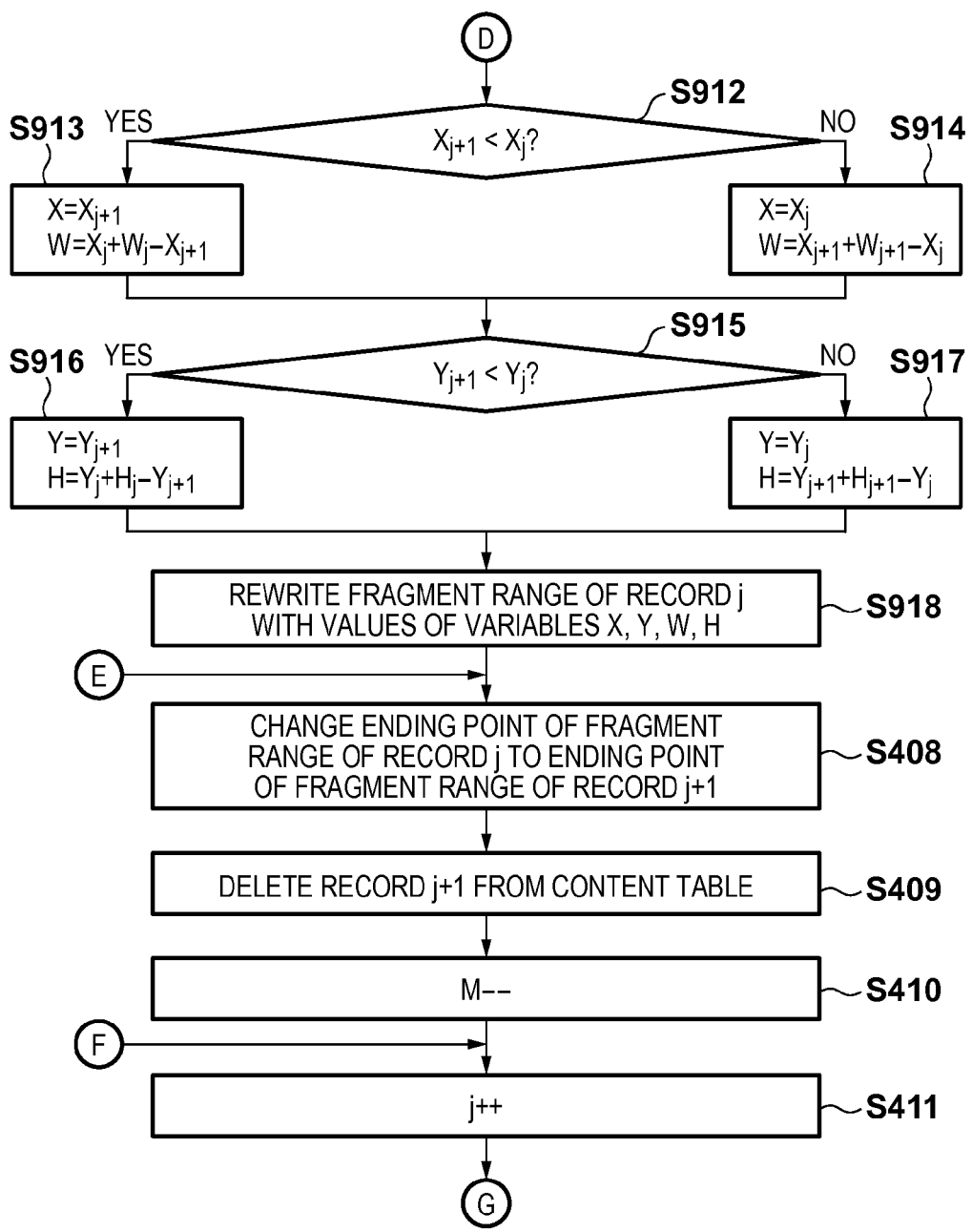

Processing shown in FIGS. 24A and 24B updates the content table shown in FIG. 22A. Update of the content table (S117) according to the sixth embodiment will be explained in detail with reference to FIGS. 24A and 24B.

The CPU 201 executes processing in steps S401 to S407 as in the first embodiment. Note that there is no processing in step S406 in the sixth embodiment.

If, for records j and j+1, link flags are negative, reference resource are identical, and the ending point and the starting point of respective fragment ranges satisfy the same condition, the CPU 201 determines whether each of records j and j+1 has a space fragment (S1301). If at least one of records j and j+1 has no space fragment, the process advances to step S408.

If each of records j and j+1 has a space fragment, the CPU 201 executes processing in steps S912 to S918 as in the third embodiment, rewrites the fragment range of record j with the values of variables X, Y, W, and H, and then advances the process to step S408.

As in the first embodiment, the CPU 201 changes the ending point of the fragment range of record j as one of successive records to the ending point of the fragment of record j+1 as the other one of the successive records (S408), and deletes record j+1 from the content table (S409).

When the processing shown in FIGS. 24A and 24B is executed for the content table shown in FIG. 22A, an updated content table shown in FIG. 22B is obtained. That is, records 3 and 4 in FIG. 22A are integrated into record 3 in FIG. 22B. Furthermore, since records 1 and 3 in FIG. 22A are spatially adjacent to each other but are not temporally adjacent to each other, they are not integrated. Records 4 and 5 in FIG. 22A are temporally adjacent to each other. If, however, records 4 and 5 were spatially integrated, the appearance would change with respect to original fragment videos, and therefore, records 4 and 5 are not integrated.

Figure 9A:
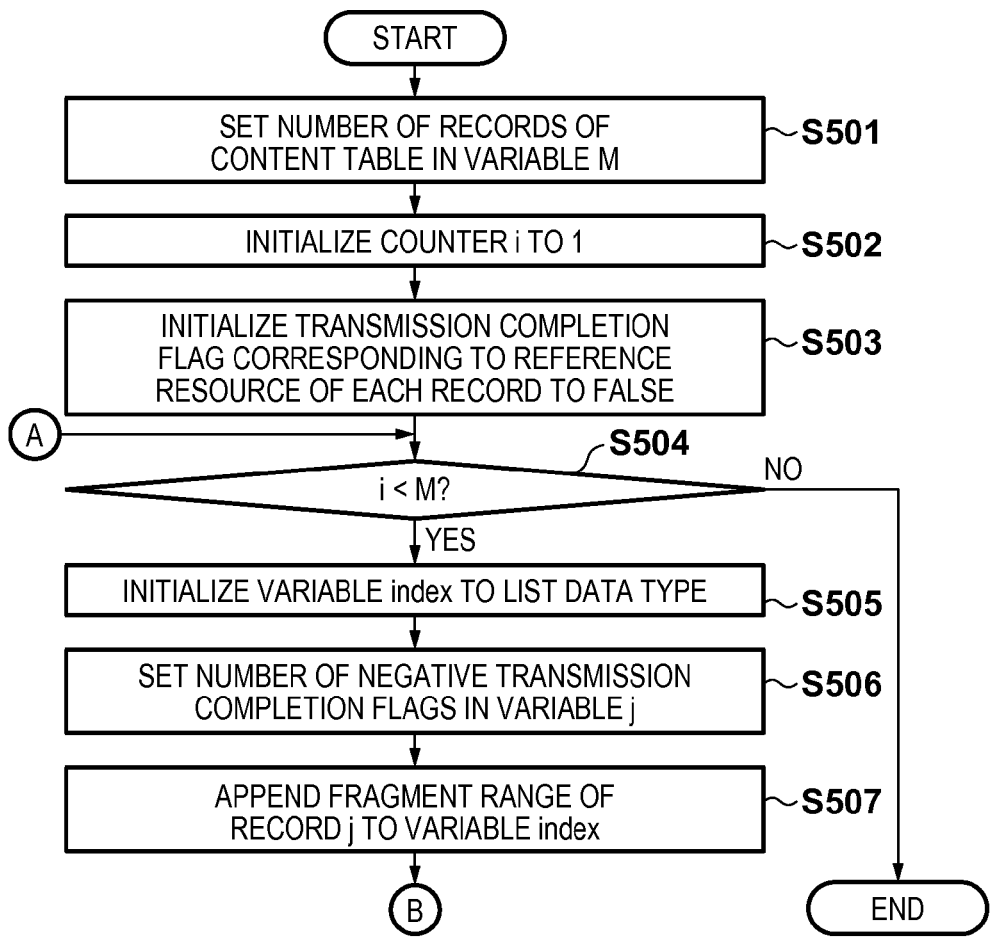
FIGS. 9A and 9B are flowcharts for explaining details of a fragment video obtaining request.
Figure 9B:
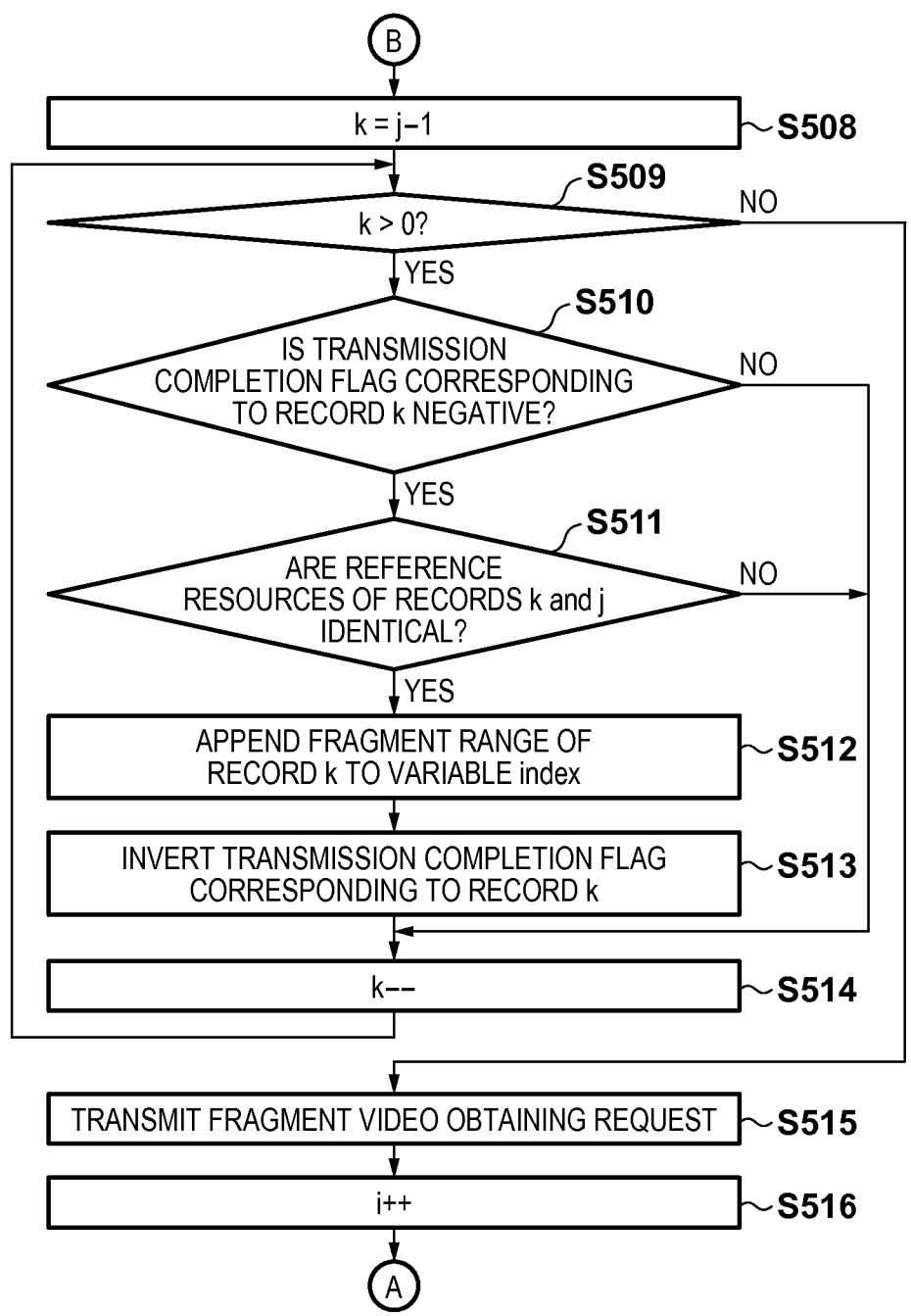

As in the first embodiment, the processing shown in the flowcharts of FIGS. 9A and 9B updates the content table shown in FIG. 22B. The updated content table is as shown in FIG. 22C.

The CPU 201 obtains video data from each stream instance based on the content table shown in FIG. 22C, and plays back a collection of videos by sequentially displaying the video data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-281012 filed Dec. 16, 2010 and No. 2011-250057 filed Nov. 15, 2011, which are hereby incorporated by reference herein in their entirety.

What is claimed is:

1. An information processing apparatus comprising:
a memory; and
a processor in communication with the memory, the processor configured to function to:
receive input data described in a markup language;
obtain, from the input data, a plurality of uniform resource identifiers respectively including fragment descriptions;
determine whether or not there are connectable fragment descriptions in the fragment descriptions included in the obtained plurality of uniform resource identifiers;
modify, in a case where it is determined that there are connectable fragment descriptions, the plurality of uniform resource identifiers having the connectable fragment descriptions to a uniform resource identifier; and
transmit the uniform resource identifier generated in the modification to a server.

2. The apparatus according to claim 1, wherein the processor is further configured to function to:
analyze a uniform resource identifier including a fragment description, which is contained in the input data;
form, as a result of the analysis, a table including a record that indicates a relationship between a resource and a fragment description; and
update, in the case where it is determined that there are connectable fragment descriptions, the table to integrate records having the connectable fragment descriptions,
wherein the updated table is used to generate the uniform resource identifier.

3. The apparatus according to claim 2,
wherein the processor is further configured to function to:
use the uniform resource identifier to obtain a fragment description of the resource; and
associate the obtained fragment description with a record of the table.

4. The apparatus according to claim 2,
wherein the resource is a video, and the fragment description indicates a starting point and an ending point of a playback associated with a time of the video, and
wherein the processor is further configured to function to determine, as records having the connectable fragment descriptions, successive records of the table in which the ending point indicated by the fragment description coincides with the starting point indicated by the fragment description.

5. The apparatus according to claim 2,
wherein the resource is a video, and the fragment description indicates a starting point and an ending point of a playback associated with a time of the video, and
wherein the processor is further configured to function to determine, as records having the connectable fragment descriptions, successive records of the table in which a difference between the ending point indicated by the fragment description and the starting point indicated by the fragment description is not larger than a threshold.

6. The apparatus according to claim 5, wherein the processor is further configured to function to change the ending point indicated by the fragment description of one of the successive records to the ending point indicated by the fragment description of another one of the successive records, and deletes the other one of the successive records.

7. The apparatus according to claim 5, wherein the threshold is obtained by multiplying a total time of extracted fragment videos by a weighting factor based on the table.

8. The apparatus according to claim 2,
wherein the resource is a video, and
wherein the fragment description indicates an extracted range associated with a space of the video.

9. The apparatus according to claim 8, wherein the processor is further configured to function to change the fragment description of one of the successive records of the table so that an extracted range indicated by the fragment description of one of the successive records includes an extracted range indicated by the fragment description of another one of the successive records, and deletes the other one of the successive records.

10. The apparatus according to claim 9,
wherein, in a case where integrating the successive records based on the extracted ranges of the fragment descriptions, and
wherein the processor is further configured to function to determine, based on a ratio of the extracted ranges before integration to the integrated extracted range whether to integrate the extracted ranges.

11. The apparatus according to claim 2, wherein,
in a case where a resource of the table includes fragment descriptions associated with a time and a space, the processor is further configured to function to determine whether the fragment descriptions are temporally connectable, and
in a case where the determining section determines that the fragment descriptions are temporally connectable, the processor is further configured to function to determine whether the fragment descriptions are spatially connectable.

12. An information processing method comprising steps of:
receiving input data described in a markup language;
obtaining, from the input data, a plurality of uniform resource identifiers respectively including fragment descriptions;
determining whether or not there are connectable fragment descriptions in the fragment descriptions included in the obtained plurality of uniform resource identifiers;
modifying, in a case where it is determined that there are connectable fragment descriptions, the plurality of uniform resource identifiers having the connectable fragment descriptions to a uniform resource identifier; and
transmitting the uniform resource identifier generated in the modification to a server.

13. A non-transitory computer readable medium storing a program that when executed causes a computer to perform an information processing method, the method comprising steps of:
receiving input data described in a markup language;
obtaining, from the input data, a plurality of uniform resource identifiers respectively including fragment descriptions;
determining whether or not there are connectable fragment descriptions in the fragment descriptions included in the obtained plurality of uniform resource identifiers;
modifying, in a case where it is determined that there are connectable fragment descriptions, the plurality of uniform resource identifiers having the connectable fragment descriptions to a uniform resource identifier; and
transmitting the uniform resource identifier generated in the modification to a server.

* * * * *